(12) United States Patent
Kim et al.

(10) Patent No.: US 9,094,530 B2
(45) Date of Patent: Jul. 28, 2015

(54) MOBILE TERMINAL AND CONTROLLING METHOD THEREOF

(75) Inventors: Moonkyung Kim, Seoul (KR); Jihye Ham, Seoul (KR); Harim Jang, Seoul (KR); Minsoo Park, Seoul (KR); Hyoungmi Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 363 days.

(21) Appl. No.: 13/542,439

(22) Filed: Jul. 5, 2012

(65) Prior Publication Data

US 2013/0187866 A1 Jul. 25, 2013

(30) Foreign Application Priority Data

Jan. 20, 2012 (KR) .................. 10-2012-0006701

(51) Int. Cl.
| | | |
|---|---|---|
| G06F 3/041 | (2006.01) | |
| H04M 1/725 | (2006.01) | |
| G06F 3/0488 | (2013.01) | |
| G06F 3/0481 | (2013.01) | |

(52) U.S. Cl.
CPC ......... *H04M 1/72519* (2013.01); *G06F 3/0481* (2013.01); *G06F 3/0488* (2013.01); *G06F 3/04817* (2013.01); *H04M 1/72544* (2013.01); *H04M 2250/22* (2013.01)

(58) Field of Classification Search
CPC .......................... G06F 3/04886; G06F 3/0486
USPC .................................. 345/156–184; 715/769
See application file for complete search history.

(56) References Cited

U.S. PATENT DOCUMENTS

| | | | | |
|---|---|---|---|---|
| 7,523,022 | B2 * | 4/2009 | Thomas et al. | 703/1 |
| 8,266,550 | B1 * | 9/2012 | Cleron et al. | 715/863 |
| 8,269,732 | B2 * | 9/2012 | Kwon | 345/173 |
| 8,766,928 | B2 * | 7/2014 | Weeldreyer et al. | 345/173 |
| 9,007,309 | B2 * | 4/2015 | Hinata | 345/173 |
| 2006/0007174 | A1 | 1/2006 | Shen | |
| 2007/0124737 | A1 * | 5/2007 | Wensley et al. | 719/314 |
| 2007/0152984 | A1 * | 7/2007 | Ording et al. | 345/173 |
| 2008/0246741 | A1 * | 10/2008 | Hinata | 345/173 |
| 2009/0034843 | A1 * | 2/2009 | Wittkamper et al. | 382/181 |
| 2009/0183112 | A1 * | 7/2009 | Higgins et al. | 715/808 |
| 2009/0219259 | A1 * | 9/2009 | Kwon | 345/173 |
| 2009/0228820 | A1 * | 9/2009 | Kim et al. | 715/769 |
| 2010/0107046 | A1 * | 4/2010 | Kang et al. | 715/207 |
| 2010/0283744 | A1 * | 11/2010 | Nordenhake et al. | 345/173 |
| 2010/0289752 | A1 * | 11/2010 | Birkler | 345/173 |
| 2010/0313124 | A1 * | 12/2010 | Privault et al. | 715/702 |
| 2011/0003621 | A1 * | 1/2011 | Atsumi | 455/566 |

(Continued)

FOREIGN PATENT DOCUMENTS

| | | |
|---|---|---|
| EP | 2113830 A2 | 11/2009 |
| EP | 2178283 A1 | 4/2010 |

(Continued)

*Primary Examiner* — Prabodh M Dharia
(74) *Attorney, Agent, or Firm* — Birch, Stewart, Kolasch & Birch, LLP

(57) ABSTRACT

A mobile terminal including a wireless communication unit configured to wirelessly communicate with at least one other terminal; a touchscreen configured to display a home screen; and a controller configured to display a plurality of objects dispersed on the home screen, receive a specific touch gesture performed on the touchscreen, and arrange and display the dispersed objects on the home screen in which the dispersed objects are moved closer to each other based on a prescribed direction of the specific touch gesture.

20 Claims, 31 Drawing Sheets

(56) References Cited

U.S. PATENT DOCUMENTS

| | | | |
|---|---|---|---|
| 2011/0025635 A1* | 2/2011 | Lee | 345/173 |
| 2011/0037710 A1* | 2/2011 | Jeong et al. | 345/173 |
| 2011/0074697 A1* | 3/2011 | Rapp et al. | 345/173 |
| 2011/0074710 A1* | 3/2011 | Weeldreyer et al. | 345/173 |
| 2011/0181539 A1* | 7/2011 | Aono | 345/173 |
| 2012/0105481 A1* | 5/2012 | Baek et al. | 345/652 |
| 2012/0200513 A1* | 8/2012 | Kim et al. | 345/173 |
| 2013/0002706 A1* | 1/2013 | Rezende et al. | 345/619 |
| 2013/0152001 A1* | 6/2013 | Lovitt et al. | 715/765 |

FOREIGN PATENT DOCUMENTS

| | | |
|---|---|---|
| EP | 2302630 A1 | 3/2011 |
| WO | WO 2006/076807 A1 | 7/2006 |

\* cited by examiner

MOBILE TERMINAL AND CONTROLLING METHOD THEREOF

Pursuant to 35 U.S.C. §119(a), this application claims the benefit of earlier filing date and right of priority to Korean Application No. 10-2012-0006701, filed on Jan. 20, 2012, the contents of which is hereby incorporated by reference herein in their entirety.

BACKGROUND OF THE INVENTION

1. Field of the Invention

Embodiments of the present invention are related to a mobile terminal, and more particularly, to a mobile terminal and a method of controlling a mobile terminal. Although features disclosed herein are suitable for a wide scope of applications, they are particularly suitable for configuring a terminal in view of enhancing user convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to their degree (e.g., ease) of mobility. Further, the mobile terminals can be further classified into handheld terminals and vehicle mount terminals according to the manner of portability.

There are ongoing efforts to support and increase the functionality of mobile terminals. Such efforts include software and hardware improvements, as well as changes and improvements in the structural components which form the mobile terminal.

Recently, a smart phone has become widely popular. Since most of users are not satisfied with applications basically installed on smart phones by manufacturers, a user usually tends to personally install a desired application on a smart phone of its own by accessing an on-line application market and then downloading the desired application from the accessed on-line application market.

When the prescribed application is downloaded, an application activating icon and an application widget related to the desired application may be downloaded to the corresponding smart phone as well. In particular, if the number of the downloaded applications increases, the number of the downloaded icons and the downloaded widgets may increase in proportion to the rising number of the downloaded applications. Therefore, many efforts need to be made to research and develop a method of facilitating the downloaded icons and widgets to be created on a display unit (especially in a home screen) of the smart phone in consideration of user's convenience.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof, by which, when a prescribed application is downloaded together with an application activating icon and an application widget related to the prescribed application, the downloaded icons and widgets can be created and arranged on a display unit with ease in consideration of user's convenience.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to the present invention may include a touchscreen configured to display a home screen, and a controller configured to control a plurality of objects to be dispersed and displayed on the home screen, and when a specific touch gesture is performed on the touchscreen, control the dispersed objects to be displayed on the home screen by adhering close to each other in a prescribed direction.

In another aspect of the present invention, a method of controlling a mobile terminal according to the present invention may include displaying a home screen, displaying a plurality of objects on the home screen in a manner that a plurality of the objects are dispersed, and when a specific touch gesture is performed on the touchscreen, displaying the dispersed objects on the home screen in a manner that the dispersed objects adhere close to each other in a prescribed direction.

In a further aspect of the present invention, computer readable medium comprises commands encoded therein, which when executed in a mobile terminal, cause the terminal to display a home screen, display a plurality of objects on the home screen in a manner that a plurality of the objects are dispersed, and when a specific touch gesture is performed on the touchscreen, display the dispersed objects on the home screen in a manner that the dispersed objects adhere close to each other in a prescribed direction.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Features of embodiments of the present invention are applicable to various types of terminals. Examples of such terminals include mobile terminals, such as mobile phones, user equipment, smart phones, mobile computers, digital broadcast terminals, personal digital assistants, portable multimedia players (PMP) and navigators. However, by way of non-limiting example only, further description will be with regard to a mobile terminal 100, and it should be noted that such teachings may apply equally to other types of terminals such as digital TV, desktop computers and so on.

Figure 1:
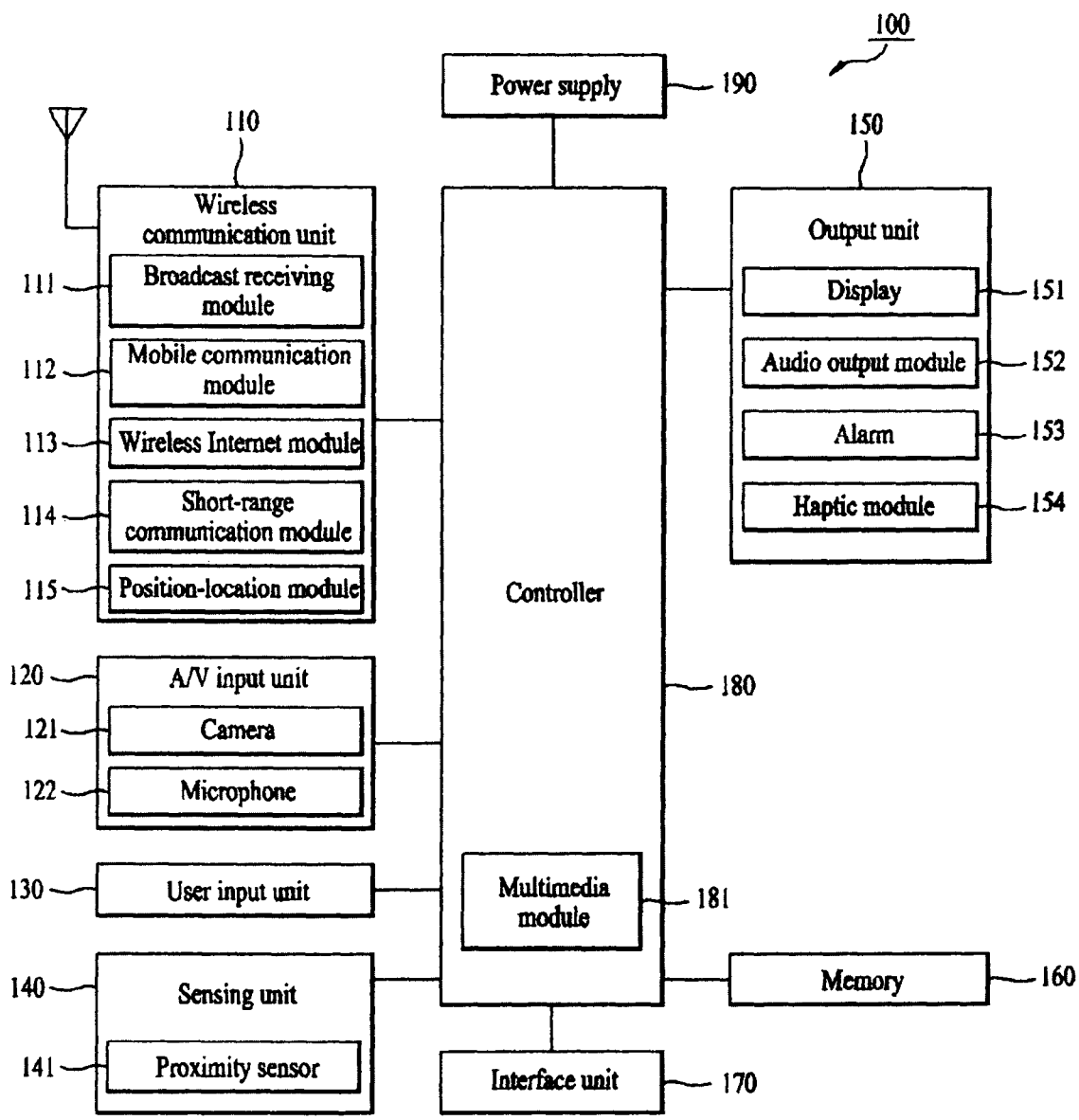
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. More or fewer components may be implemented according to various embodiments.

The wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel. The broadcast channel may include a satellite channel and a terrestrial channel. At least two broadcast receiving modules 111 can be provided in the mobile terminal 100 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 111 may be configured to receive broadcast signals transmitted from various types of broadcast systems. By nonlimiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 111 can be configured to be suitable for other broadcasting systems as well as the above-noted digital broadcasting systems.

The broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.) via a mobile network such as GSM (Global System for Mobile communications), CDMA (Code Division Multiple Access), WCDMA (Wideband CDMA) and so on. Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), GSM, CDMA, WCDMA, LTE (Long Term Evolution) etc.

Wireless internet access by Wibro, HSPDA, GSM, CDMA, WCDMA, LTE or the like is achieved via a mobile communication network. In this aspect, the wireless internet module 113 configured to perform the wireless internet access via the mobile communication network can be understood as a sort of the mobile communication module 112.

The short-range communication module 114 facilitates relatively short-range communications. Suitable technologies for implementing this module include NFC(Near Field Communication), radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

According to the current technology, the GPS module 115 is able to precisely calculate current 3-dimensional position information based on at least one of longitude, latitude and altitude and direction (or orientation) by calculating distance information and precise time information from at least three satellites and then applying triangulation to the calculated information. Currently, location and time informations are calculated using three satellites, and errors of the calculated location position and time informations are then amended using another satellite. Besides, the GPS module 115 is able to calculate speed information by continuously calculating a real-time current location.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. Further, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices. Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect at least one of an ambient light around the mobile terminal 100, an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. Further, the sensing unit 140 can include a proximity sensor 141.

The output unit 150 generates outputs relevant to the senses of sight, hearing, touch and the like. Further, the output unit 150 includes the display 151, an audio output module 152, an alarm unit 153, and a haptic module 154 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 by being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor 141 can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

For clarity and convenience of explanation, an action for enabling the pointer approaching the touchscreen to be recognized as placed on the touchscreen may be named 'proximity touch' and an action of enabling the pointer to actually come into contact with the touchscreen may named 'contact touch'. Further, a position, at which the proximity touch is made to the touchscreen using the pointer, may mean a position of the pointer vertically corresponding to the touchscreen when the pointer makes the proximity touch.

The proximity sensor detects a proximity touch and a proximity touch pattern (e.g., a proximity touch distance, a proximity touch duration, a proximity touch position, a proximity touch shift state, etc.). Further, information corresponding to the detected proximity touch action and the detected proximity touch pattern can be output to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be output via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be output by being synthesized together or can be output in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures (or photo), moving pictures, etc. Further, a recent use history or a cumulative use frequency of each data (e.g., use frequency for each phonebook, each message or each multimedia) can be stored in the memory unit 160. Moreover, data for various patterns of vibration and/or sound output in case of a touch input to the touchscreen can be stored in the memory unit 160.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. Further, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include a Near Field Communication (NFC) Chip, User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectable to the mobile terminal 100 via the corresponding port.

It is not mandatory for the identity module to be detachably attached to the mobile terminal via the interface unit 170. Alternatively, the identity module may be permanently built as a sort of the memory unit 160 in the mobile terminal 100.

When the mobile terminal 110 is connected to an external cradle, the interface unit 170 becomes a passage for supplying the mobile terminal 100 with a power from the cradle or a passage for delivering various command signals input from the cradle by a user to the mobile terminal 100. Each of the various command signals input from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern (or image) recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
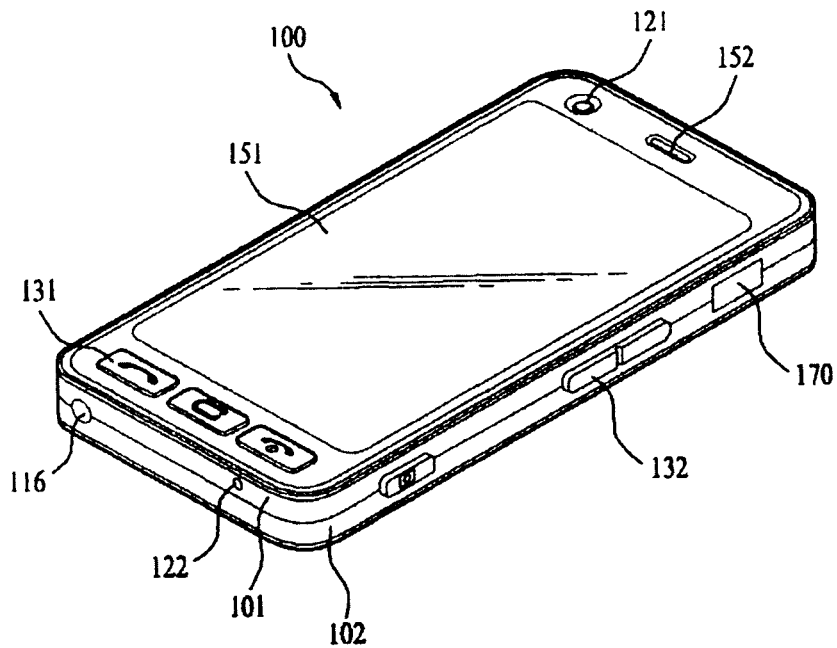
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. Further, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content input by the first or second manipulating unit 131 or 132 can be diversely set. For instance, such a command as start, end, scroll and the like is input to the first manipulating unit 131. In addition, a command for a volume adjustment of sound output from the audio output unit 152, a command for a switching to a touch recognizing mode of the display 151 or the like can be input to the second manipulating unit 132.

Figure 2B:
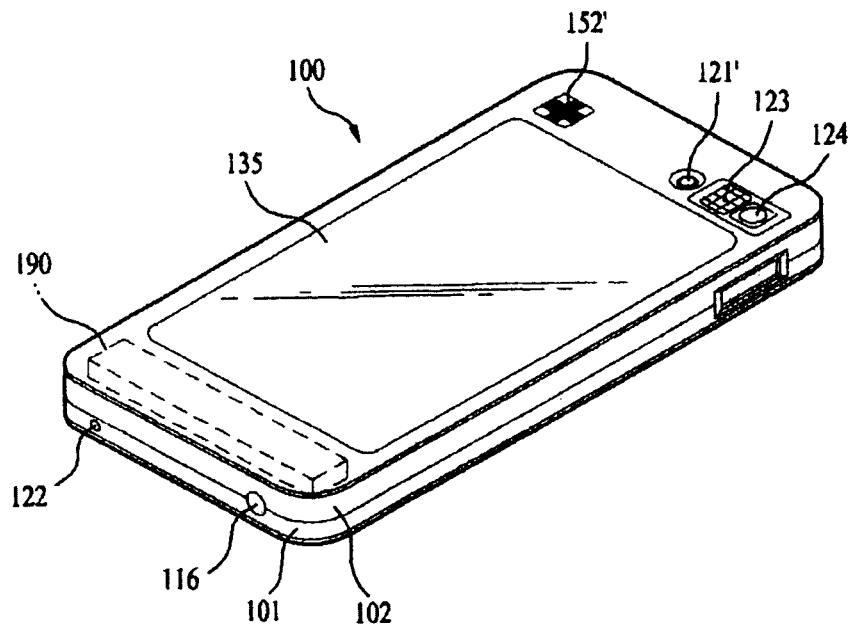
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. In addition, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 116 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. In addition, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from both of its faces, the visual information is viewable via the touchpad 135 as well. The information output from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the disclosure presented herein, embodiments related to a method, which can be implemented in the mobile terminal 100, for controlling the mobile terminal are described with reference to the accompanying drawings.

If the display module 151 includes a touchscreen, implementation of the following embodiments may be further facilitated. Therefore, the following description is made on the assumption that the display module 151 includes a touchscreen. In addition, a reference number 400 shall refer to a display screen of the touchscreen 151 in the following description.

Moreover, the following embodiments may be applicable to a mobile terminal adopting Android series OS (operating system). Yet, the following embodiments are non-limited by the mobile terminal adopting Android series OS. In addition, it is apparent to those skilled in the art that the following embodiments may be applicable to mobile terminals adopting operating systems other than Android series OS.

Figure 3:
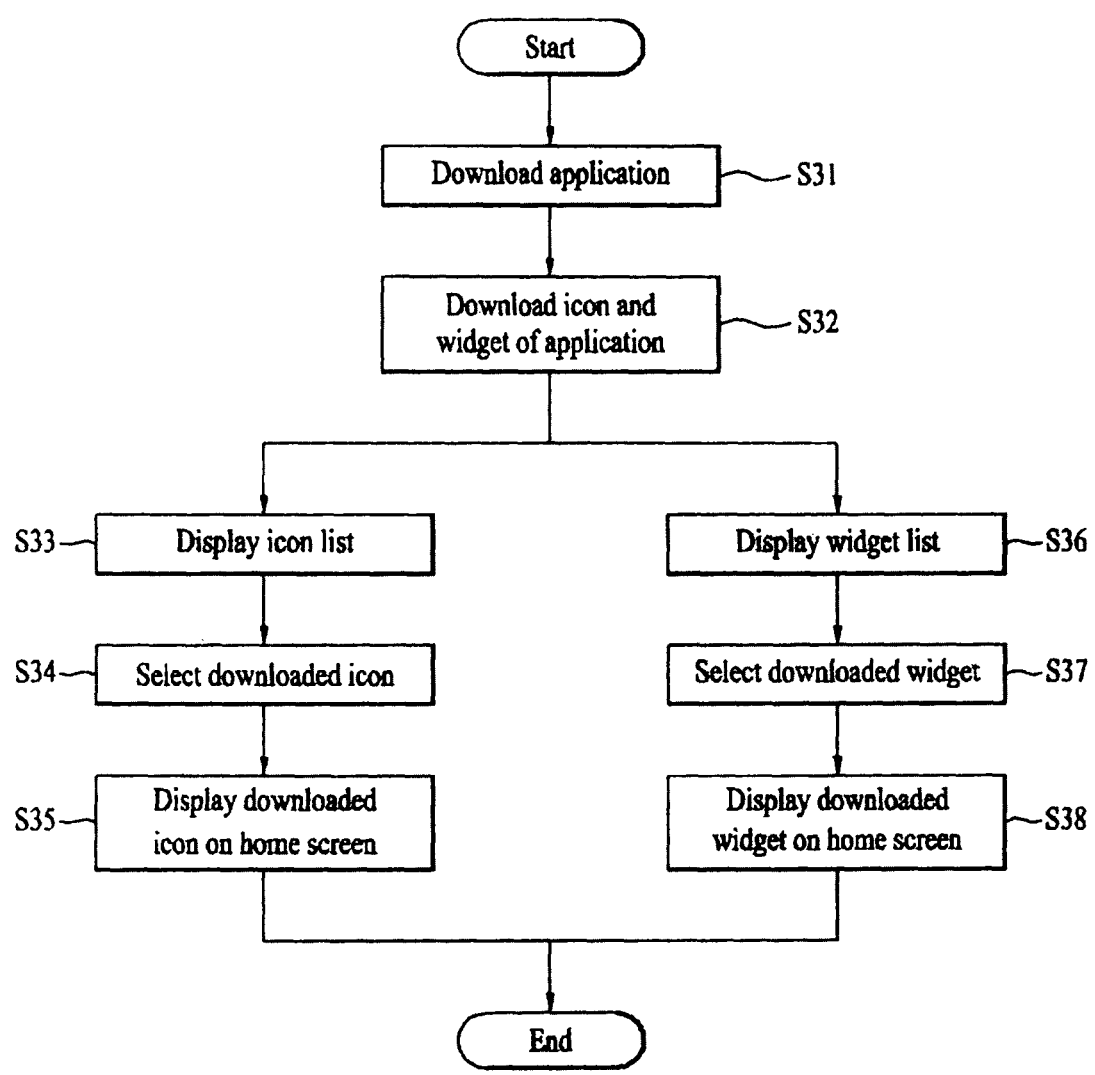
FIG. 3 is a flowchart illustrating a method of controlling a mobile terminal according to one embodiment of the present invention.

FIG. 3 is a flowchart illustrating a method of controlling a mobile terminal according to one embodiment of the present invention. FIGS. 4 to 7 are diagrams of display screen configurations to implement a method of controlling a mobile terminal according to one embodiment of the present invention.

Referring to FIGS. 3 to 7, the controller 180 of the mobile terminal 100 controls the wireless communication unit 110 to download a desired application to the memory 160 in accordance with a user command by accessing an external device in accordance with a user command (S31).

Figure 4:
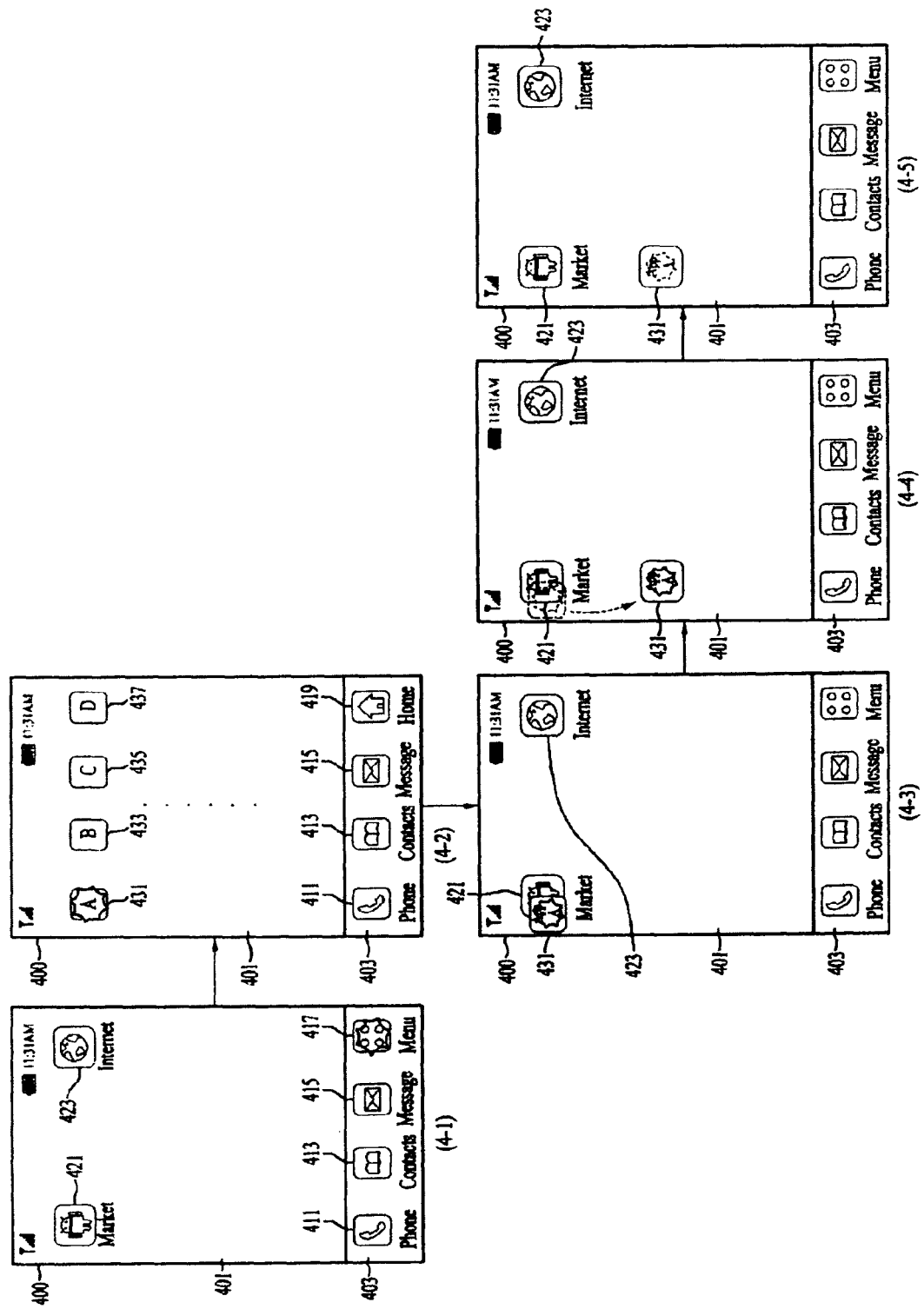
FIGS. 4 to 7 are diagrams of display screen configurations to implement a method of controlling a mobile terminal according to one embodiment of the present invention.

In doing so, the user command for accessing the external device may be input, as shown in FIG. 4 (4-1), by an external server access icon 421 displayed on a home screen of a $1^{st}$ region 401 of the touchscreen 400, for example.

When the desired application is downloaded, an application icon (hereinafter named an app application or an icon) for activating the desired application and an application widget (hereinafter named a widget) for enabling some limited functions of the desired application to be ordinarily active on the home screen may be downloaded and saved in the memory 160 together with the desired application. In this instance, each of the icon and the widget may be commonly called an object.

After the desired application has been completely downloaded, the controller 180 can also not automatically display the downloaded app icon and/or widget on the touchscreen 400.

The above-described user's manipulation of the mobile terminal 100 to download the desired application by accessing the external server and then searching for the desired application is apparent to those skilled in the art and its details are omitted for clarity of the following description.

The home screen is further described as follows. First of all, when the touchscreen is unlocked (or released from a locked state where the touchscreen limitedly recognizes touch action(s) thereon or cannot recognize any touch action thereon), the home screen may be defined as a screen initially displayed on the screen. The touchscreen may be turned on or off in the locked state. In this instance, at least one icon or widget may be displayed on the home screen to activate an application or an internal function. At least two home screens may also exist in the mobile terminal. In doing so, when a prescribed touch gesture is performed on the touchscreen, the at least two home screens may be sequentially displayed on the 1st region 401 of the touchscreen 400 one by one. Further, different icons or widgets may be arranged on the at least two home screens, respectively.

In this specification, the touch gesture includes one of a simple touch, a double touch, a multi-touch, a touch drag, a touch flicking and the like, each of which is performed on the touchscreen.

An icon tray for gathering and arranging at least one or more frequently-used icons thereon may also be displayed on a $2^{nd}$ region of the touchscreen 400 together with the home screen. Referring to FIG. 4 (4-1), a phone (call) icon 411, a contacts icon 413, a message icon 415 and a menu icon 417 are arranged on the icon tray 403, for example.

In the following description, a process for newly displaying an app icon downloaded and saved in the memory 160 on the home screen is explained.

First of all, a user command for displaying at least one or more icons saved in the memory 160 on the touchscreen 400 is input. For instance, referring to FIG. 4 (4-1), the user command may include an action of touching or tapping the menu icon 417 arranged on the icon tray 403.

If the user command is input, referring to FIG. 4 (4-2), the controller 180 controls the at least one or more icons 431, 433, 435 and 437, which are saved in the memory 160, to be displayed on the $1^{st}$ region of the touchscreen 400 (S33). In this instance, the displayed icons may be saved in advance by a manufacturer of the mobile terminal 100 or may be downloaded by a user from the accessed external server. Assume that an icon 'A' 431 among the displayed icons is the downloaded icon.

Using a pointer (e.g., a finger, a stylus pen, etc.), the user can touch and select the downloaded icon, i.e., the icon 'A' 431 from the displayed icons (S34).

Referring to FIG. 4 (4-3), while the user keeps touching the icon 'A' 431 with the pointer on the touchscreen 400, the controller 180 controls the icon 'A' 431 to be created on the home screen (S35). In particular, the icon 'A' 431 may be created to be located at one point on the touchscreen 400 touched with the pointer.

Referring to FIG. 4 (4-4), the user can move a desired position of the pointer by keeping the touchscreen 400 touched with the pointer. In particular, the user can touch & drag the pointer to the desired position. If so, the controller 180 controls the icon 'A' 431 to move to the desired position along a trace of the touch & drag.

Referring to FIG. 4 (4-5), if the pointer arrives at the desired position, the user can release the touch to the touchscreen with the pointer. If so, in response to the release of the touch with the pointer, the controller 180 controls the icon 'A' 431 to be arranged at the desired position on the home screen.

In the following description, the process for newly displaying the widget downloaded to the memory 160 on the home screen is explained.

First of all, a user command for displaying at least one widgets saved in the memory 160 on the touchscreen 400 may be input. In this instance, referring to FIG. 5 (5-1), the user command may be executed in a manner that an empty space of the home screen is long touched for example, by which the used command is non-limited.

If so, the controller 180 can control a list 440 of the at least one or more widgets 441, 443, 445 and 447 saved in the memory 160 to be displayed on the touchscreen 400 (S36). The displayed widgets 441, 443, 445 and 447 may be saved in advance by a manufacturer of the mobile terminal 100 or may be downloaded by a user from the accessed external server. The saved widgets 441, 443, 445 and 447 are assumed as corresponding to the saved app icons 431, 433, 435 and 447, respectively. For instance, the widget 'a' 441 and the icon 'A' 431 may relate to the same application in common. As the user command is input, the mobile terminal 100 may be considered as having entered a home screen edit mode. In this instance, the home screen edit mode may be the mode to edit an object of the home screen (e.g., to add a new object, to change an object, to delete an object, etc.). Once the home screen edit mode is entered, referring to FIG. 5 (5-2), when the list 440 of the widgets are displayed, a widget icon 412, a shortcut icon 414, a folder icon 416 and a background image icon 418 are newly displayed on the icon tray 403.

However, not all of the saved app icons have to correspond to the saved widgets, respectively. In particular, when a prescribed application is downloaded, an app icon corresponding to the downloaded application may be downloaded only without a corresponding widget.

Assume that the widget 'a' 441 among the displayed widgets is the widget downloaded in association with the desired application. Using the pointer, the user can touch and select the downloaded widget, i.e., the widget 'a' 441 from the displayed widgets (S37).

Figure 5:
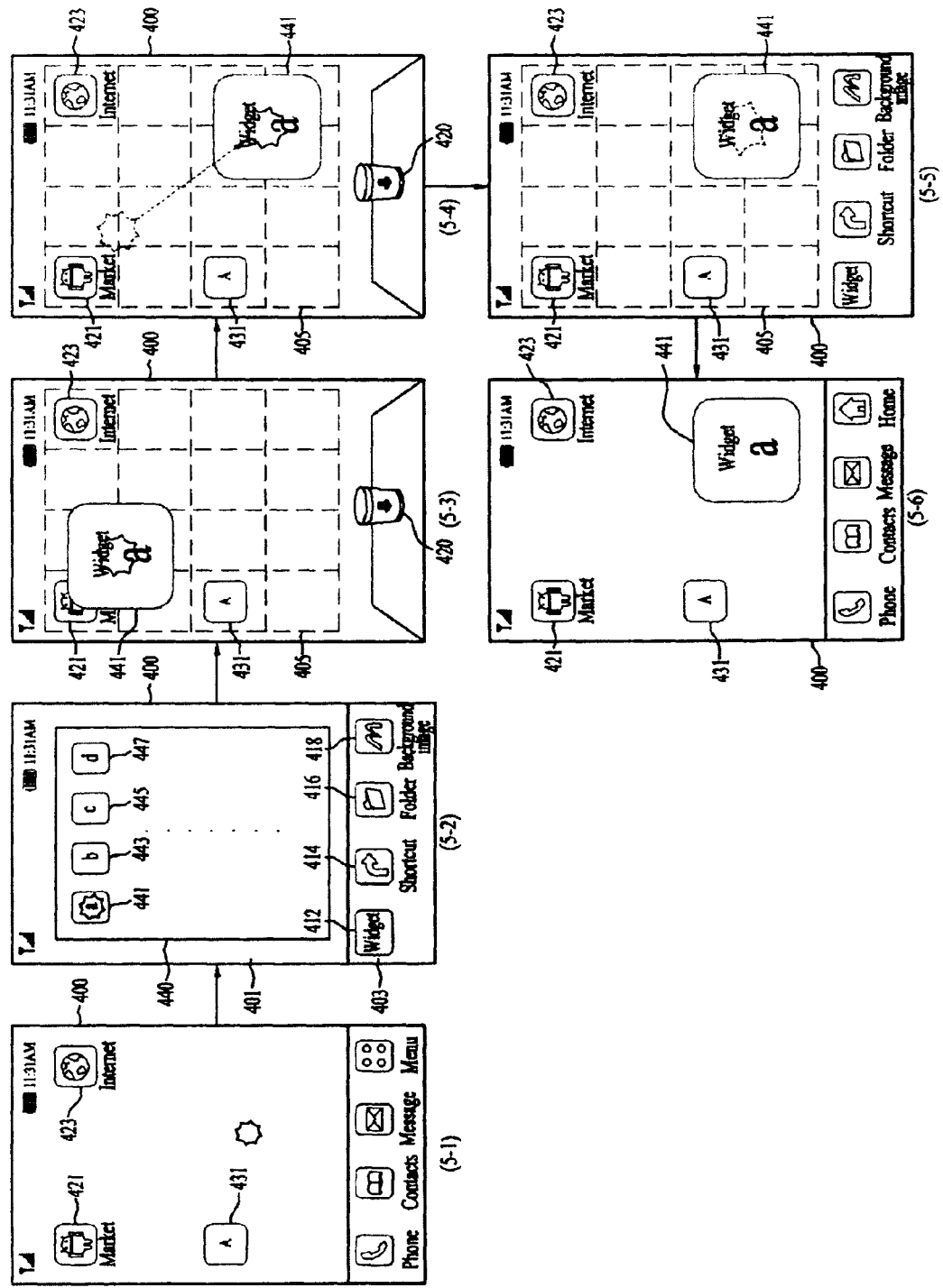

If so, referring to FIG. 5 (5-3), while the touch to the widget 'a' with the pointer on the touchscreen 400 is maintained during the home screen edit mode, a trashcan icon 420 may be newly displayed as soon as the widget icon 412, the shortcut icon 414, the folder icon 416 and the background image icon 418 disappear. If a prescribed object is touched and dragged to the trashcan icon 420, the prescribed object may be deleted. During the home screen edit mode, an object arrangement grid 405 may be displayed on the touchscreen 400 to help the determination of arranged positions of objects. In particular, each of the objects may be arranged to occupy one or more cells included in the object arrangement grid 405. During the home screen edit mode, it may not be mandatory for the object arrangement grid 405 to be displayed on the touchscreen 400.

Moreover, referring to FIG. 5 (5-3), while the user maintains the touch on the widget 'a' 441, the controller 180 controls the widget 'a' 441 to be created on the home screen (S38). In particular, the widget 'a' 441 may be created to be located at one point on the touchscreen 400 touched with the pointer.

Referring to FIG. 5 (5-4), the user can move the pointer to a desired position (or a desired cell) by maintaining the touch on the touchscreen. That is, the user can touch and drag the pointer to the desired position. If so, the controller 180 controls the widget 'a' 441 to move to the desired position along a trace of the touch & drag.

Referring to FIG. 5 (5-5), when the pointer arrives at the desired position, the user can release the touch to the touchscreen 400 with the pointer. If so, in response to of the release of the touch with the pointer, the controller 180 controls the icon 'A' 431 to be arranged at the desired position on the home screen. Further, the controller 180 controls the widget icon 412, the shortcut icon 414, the folder icon 416 and the background image icon 418 to appear again as soon as the trashcan icon 420 disappears from the 2$^{nd}$ region. Of course, unlike the illustration shown in FIG. 5 (5-5), even if the touch is released, the trashcan icon 420 may keep being displayed on the 2$^{nd}$ region, and the widget icon 412, the shortcut icon 414, the folder icon 416 and the background image icon 418 may not appear again.

Thereafter, the user can input a user command to finish the home screen edit mode. In this instance, the user command for finishing the home screen edit mode includes an appropriate manipulation of the user input unit 130, for example.

If this command is input, referring to FIG. 5 (5-6), the controller 180 controls the home screen edit mode to be finished from the mobile terminal 100 and controls the newly added widget 'a' 441 to be displayed at the user-designated position on the home screen of the touchscreen 400. Moreover, if the home screen edit mode is finished, the controller 180 controls the object arrangement grid 405 to disappear from the home screen.

According to the above description with reference to FIGS. 4 and 5, the position, at which the newly created object will be arranged, is assumed as an empty space. In the following description, assume a case that a prescribed object is already present at a position at which a newly created object will be arranged. This is explained with reference to FIG. 6 as follows.

Figure 6:
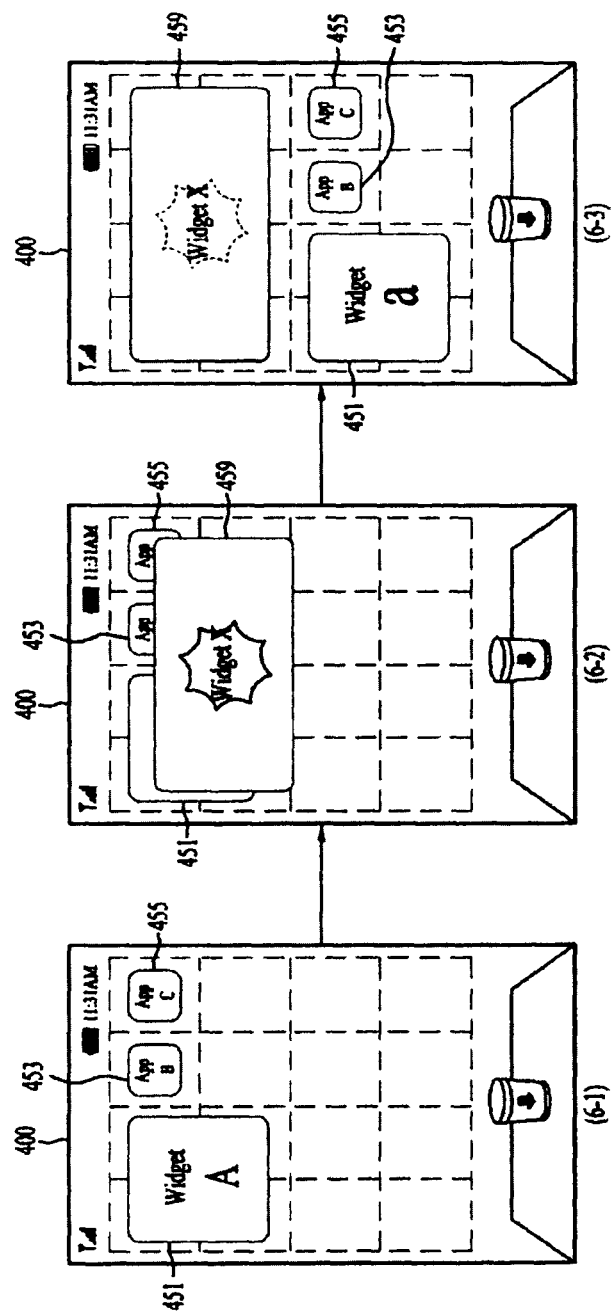

Referring to FIG. 6 (6-1), assume that the mobile terminal 100 is in the home screen edit mode and that three (3) objects (i.e., widget A, app B, and app C) 451, 453 and 455 exist on the home screen of the touchscreen 400.

In doing so, referring to FIG. 6 (6-2), assume that a new object (i.e., widget X) 459 is created on the home screen and that the new object 459 is moved over the previously existing three (3) objects by touch & drag. That is, the process for creating and then moving the new object 459 to the desired position on the home screen can be performed in the same manner as mentioned in the foregoing description. Further, assume that the touch & drag is released from the previously existing 3 objects.

If so, referring to FIG. 6 (6-3), in response to the release of the touch & drag, the controller 180 controls the new object 459 to be arranged at the position wherein the 3 objects used to be located. Further, the controller 180 may also control the 3 objects to be automatically moved to a different empty space on the home screen. FIG. 6 (6-3) shows that the 3 objects are automatically moved to the different empty space on the home screen by keeping their relative positions in-between. However, if the different empty space is insufficient to keep the relative positions among the 3 objects or a shape of the different empty space is not suitable to keep the relative positions among the 3 objects, the relative positions among the 3 objects may be modified to fit the different empty space if necessary.

However, a size of the different empty space may be insufficient to receive the 3 objects therein. That is, the home screen may not have an empty space to accept the new widget 459. This case is further described in detail with reference to FIG. 7 as follows.

Figure 7:
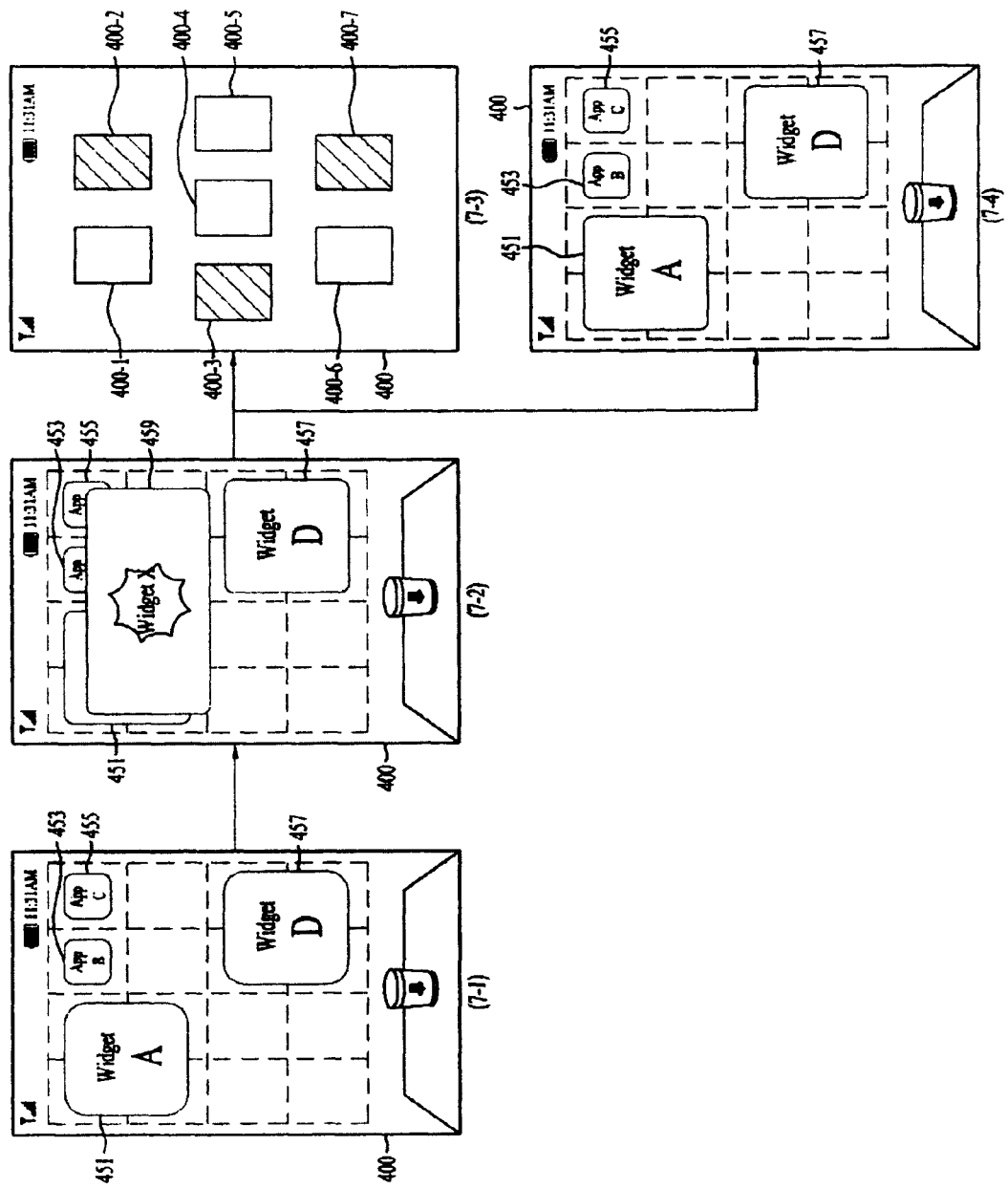

Referring to FIG. 7 (7-1), assume that the mobile terminal 100 is in the home screen edit mode and that four (4) objects (i.e., widget A, app B, app C, and widget D) 451, 453, 455 and 457 exist on the home screen of the touchscreen 400.

In doing so, referring to FIG. 7 (7-2), assume that a new object (i.e., widget X) 459 is selected to be created on the home screen and that the new object 459 is moved over the previously existing 3 objects (widget A, app B, app C) 451, 453 and 455 by touch & drag. Further, assume that the touch & drag is released from the previously existing 3 objects.

However, the home screen may not have an empty space large enough to accept the new widget 459, as shown in FIG. 7 (7-2). If so, referring to FIG. 7 (7-3), the controller 180 can control the at least two or more home screens 4001-1 to 400-7 of the mobile terminal 100 to be simultaneously displayed on the touchscreen 400. Further, the controller 180 can control the home screens 400-1, 400-4, 400-5 and 400-6, each of which has an empty space to accept the new widget 459, among the at least two or more home screens to be displayed by being visually discriminated. A user can touch and select one of the home screens 400-1, 400-4, 400-5 and 400-6, each of which has the empty space. If so, the controller 180 controls the new widget 459 to be arranged on the selected home screen (not shown in the drawing).

However, it may happen that there is no home screen having the empty space for accepting the new widget 459 among the at least two or more home screens. If so, referring to FIG. 7 (7-4), the controller 180 controls the new widget not to be created on the home screen.

As mentioned in the above description, when an empty space is dispersed on a home screen, it may be difficult for a user to intuitively recognize a size of the empty space. Accordingly, when a user attempts to arrange a new object (e.g., widget) on a home screen, it may be difficult for the user to intuitively recognize whether the new object is fit for the empty space within the home screen. In the following description, even if an empty space is dispersed to exist in a home screen, a method for enabling a user to intuitively recognize a size of the empty space in the home screen is explained with reference to FIGS. 8 and 9.

Figure 8:
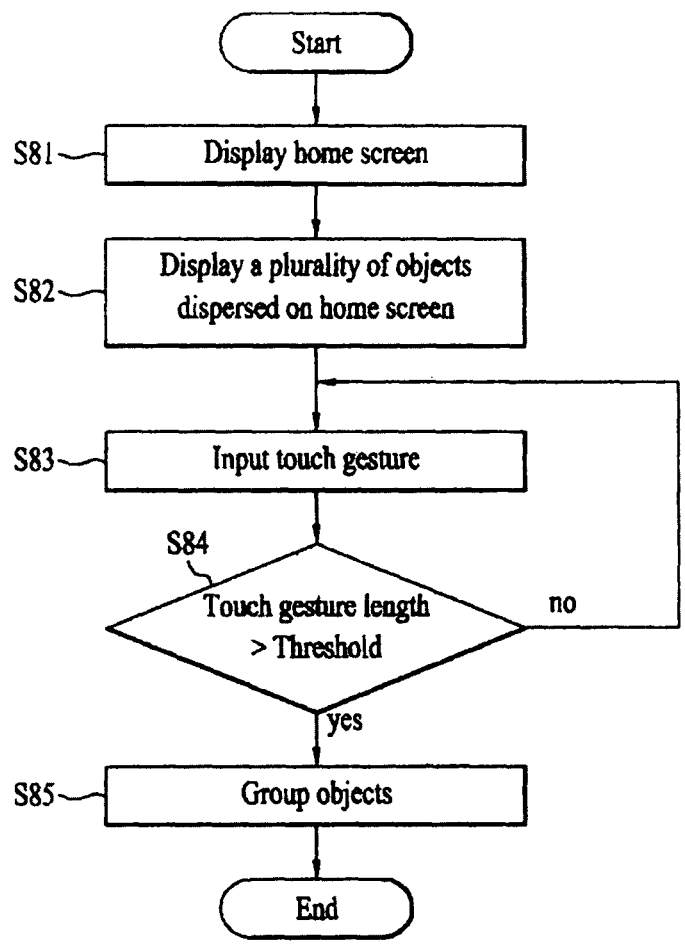
FIG. 8 is a flowchart illustrating a method of controlling a mobile terminal according to another embodiment of the present invention.
Figure 9:
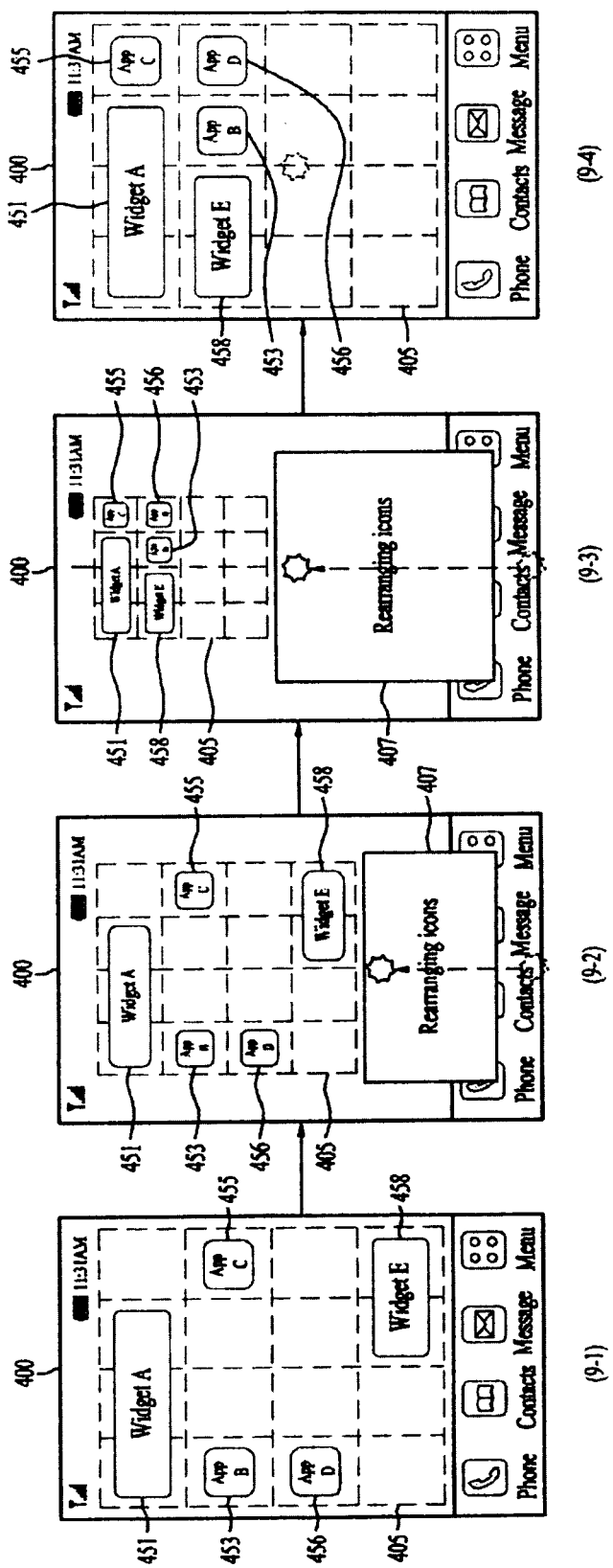
FIGS. 9 to 14 are diagrams of display screen configurations to implement a method of controlling a mobile terminal according to another embodiment of the present invention.

FIG. 8 is a flowchart illustrating a method of controlling a mobile terminal according to another embodiment of the present invention. Further, FIG. 9 is a diagram of display screen configurations to implement a method of controlling a mobile terminal according to another embodiment of the present invention. The following description may be made on the assumption that the mobile terminal 100 is or is not in the home screen edit mode. FIG. 9 shows that the object arrangement grid 405 is displayed on the touchscreen. However, it is not mandatory for the object arrangement grid 405 to be displayed on the touchscreen.

Referring to FIG. 9 (9-1), the home screen is displayed on the touchscreen 400 (S81). Further, a plurality of objects are dispersed and displayed on the home screen (S82). Since the steps S81 and S82 are already mentioned in the foregoing description, their details are omitted from the following description for clarity.

Referring to FIG. 9 (9-2), a single touch gesture may be input to the touchscreen 400 to group the objects. This touch gesture may correspond to a moving trace of a pointer that has moved from an initial point on the touchscreen initially touched with the pointer to an end point of the touch gesture. That is, the single touch gesture may be understood as a user's gesture that is performed by touching the touchscreen with the pointer, moving the pointer by maintaining the corresponding touch, and then releasing the touch with the pointer.

The touch gesture may be performed along any pattern of a trace. In the following description, the touch gesture for grouping the objects is assumed as having a straight line pattern extending in one direction. FIG. 9 (9-2) shows that a user performs a touch drag gesture by touching a bottom one of four (4) sides of the touchscreen with the pointer and then dragging the pointer in top direction by maintaining the corresponding touch. In FIG. 9 (9-2), since the touchscreen still keeps being touched with the pointer for the touch drag gesture, the touch drag gesture may be considered incomplete despite being initiated.

If so, in response to the incomplete touch drag gesture, the controller 180 determines whether a length of the touch drag gesture is greater than a prescribed threshold. If the length of the touch drag gesture is not greater than the threshold, referring to FIG. 9 (9-2), the controller 180 controls a size of the object arrangement grid 405 to be gradually decreased in proportion to the length of the touch drag gesture. As the object arrangement grid 405 is reduced, the controller 180 controls the objects in the home screen to be arranged to fit the reduced object arrangement grid 405. Further, the size of the object arrangement grid 405 may not be reduced in response to the incomplete touch drag gesture.

As the touch drag gesture keep proceeding, the controller 180 controls an object rearrangement indication 407 to be displayed on a bottom end portion of the touchscreen 400 to indicate that the objects are being rearranged. In this instance, a size of the object rearrangement indication 407 may increase in proportion to a length of the touch drag gesture. In particular, the longer the touch drag gesture becomes, the larger the object rearrangement indication 407 gets. Optionally, it is not mandatory for the object rearrangement indication 407 to be displayed.

The incomplete touch drag gesture may continue to proceed along the straight line extending in one direction. If so, in response to the ongoing incomplete touch drag gesture, the controller 180 can determine whether the length of the touch drag gesture is greater than a prescribed threshold. If the length of the touch drag gesture is greater than the threshold, referring to FIG. 9 (9-3), the controller 180 controls the objects to be automatically grouped by being arranged or sorted in the one direction on the home screen by adhering close to each other. In particular, as the touch drag gesture has been performed in the bottom-to-top direction of the touchscreen 400, the objects can adhere close to each other in the bottom-to-top direction. Referring to FIG. 9 (9-3), in order for the objects to adhere further close each other, relative positions among the objects may be changeable. In doing so, in order to further adhere close to each other, the objects may rotate clockwise or counterclockwise (for example by 90 degree or may not rotate at all. For clarity of the following description, assume that the objects may not rotate.

As the touch drag gesture continues to proceed, the size of the grid 405 shown in FIG. 9 (9-3) gets smaller than that shown in FIG. 9 (9-2), while the object rearrangement indication 407 shown in FIG. 9 (9-3) becomes bigger than that shown in FIG. 9 (9-2), for example. However, once the grouping of the objects is completed, even if the touch drag gesture continues to proceed along the straight line in the one direction, the size of the grid 405 may stop decreasing but the size of the object rearrangement indication 407 may also stop increasing.

If the grouping of the objects is completed, the pointer for the touch drag gesture stops moving any further and the touchscreen 400 can be released from the touch with the pointer, whereby the single touch gesture can be completed.

If so, referring to FIG. 9 (9-4), in response to the release of the touch with the pointer, the controller 180 controls the size of the grid 405 to return to its original size as soon as the object rearrangement indication 407 disappears. Of course, if the object rearrangement indication 407 is not displayed from the beginning or the grid 405 is not reduced at all, the object rearrangement indication 407 may not need to disappear or the size of the object rearrangement indication 407 may not need to return to its original size. Subsequently, the controller 180 controls the objects to be grouped by adhering close to each other within the grid 405 in the original size. Therefore, the grouping of the objects can be completed. The closely-adhered objects may mean that there is no empty room among the closely-adhered objects for any smallest object to be inserted therein.

That is, the at least two or more objects (e.g., at least three or more objects, at least four or more objects, etc.) can be automatically grouped as long as a (relative) length of a single touch drag gesture applied to the touchscreen 400 is greater than the threshold.

Meanwhile, before the objects are grouped, as shown in FIG. 9 (9-2), the pointer for the touch drag gesture stops moving and is detached from the touchscreen 400 to release the corresponding touch. Moreover, before the objects are grouped, the pointer for the touch drag gesture may move to the initially touched position (e.g., the bottom side) along a straight line in direction opposite to the one direction instead of being detached from the touchscreen (not shown in the drawing). If so, the controller 180 controls the touchscreen 400 to return to the configuration shown in FIG. 9 (9-1).

Meanwhile, referring to FIG. 9 (9-3), even if the grouping of the objects is completed, before the pointer for the touch drag gesture is detached from the touchscreen 400 to release the touch, the pointer may move toward the initially touched position along a straight line in the direction opposite to the one direction.

In this instance, the controller 180 calculates a distance between the initially touched position of the pointer and a finally located position of the pointer. If the calculated distance is smaller than the threshold, the controller 180 can control the grid 405 and the object rearrangement indication 407 to return to the former grid shown in FIG. 9 (9-2) and the former object rearrangement indication 407 shown in FIG. 9 (9-2). In particular, if the calculated distance is smaller than the threshold, the size of the grid 405 becomes greater than that shown in FIG. 9 (9-3), the size of the object rearrangement indication 407 becomes smaller than that shown in FIG. 9 (9-3), and the grouped objects may be released from the grouping to be dispersed to their original positions, respectively.

Moreover, referring to FIG. 9 (9-3), in order for the objects to adhere closer to each other, relative positions among the objects may be changed. In the following description, a process for changing the relative positions is explained in detail.

For instance, when the touch drag gesture is performed in a bottom-to-top direction, the objects may adhere close to each other in the vicinity of one side (e.g., a top side) of the touchscreen (that is, the grid 405 within the touchscreen) indicated by the bottom-to-top direction. When the objects adhere close to each other, a $1^{st}$ object, which is the biggest among the objects, may be arranged closest to the top side. If at least two biggest objects are present, a randomly selected one of the at least two biggest objects may be arranged closest to the top side.

Subsequently, a $2^{nd}$ object second biggest among the objects (or a $2^{nd}$ object in a biggest size like the $1^{st}$ object) may be attempted to be arranged closest to the top side. If at least two $2^{nd}$ objects in a $2^{nd}$ biggest size (or at least two $2^{nd}$ objects in a biggest size) are present, a randomly selected one of the at least two may be attempted to be arranged closest to the top side.

As a result of the above attempt, if there is a sufficient empty space (or area) on the top side to get closest to the top side, the $2^{nd}$ object may be also arranged closest to the top side in parallel with the $1^{st}$ object already arranged on the top side such that the first and second objects are most adjacent to the top side.

On the contrary, as a result of the above attempt, if there is no sufficient empty space (or area) on the top side to get closest to the top side, the $2^{nd}$ object may be arranged to get closer to the top side by leaving the $1^{st}$ object arranged on the top side in-between. This arrangement may be matched with the configuration shown in FIG. 9 (9-3). That is, the largest $1^{st}$ object may correspond to the widget A 451 shown in FIG. 9 (9-3) and the second biggest $2^{nd}$ object may correspond to the widget E 458 shown in FIG. 9 (9-3).

Thereafter, a $3^{rd}$ object may be repeatedly arranged close to the top side in the same manner as mentioned in the above description. This process is apparent to those skilled in the art and its details are omitted from the following description for clarity.

According to the description of the above embodiment, when the pointer for the touch drag gesture having a length greater than the threshold is released, the grouping of the objects is automatically completed, by which the present embodiment is non-limited. For instance, although the pointer for the touch drag gesture having a length greater than the threshold is released, the grouping of the objects may be manually completed. This is further described in detail with reference to FIG. 10 as follows.

Figure 10:
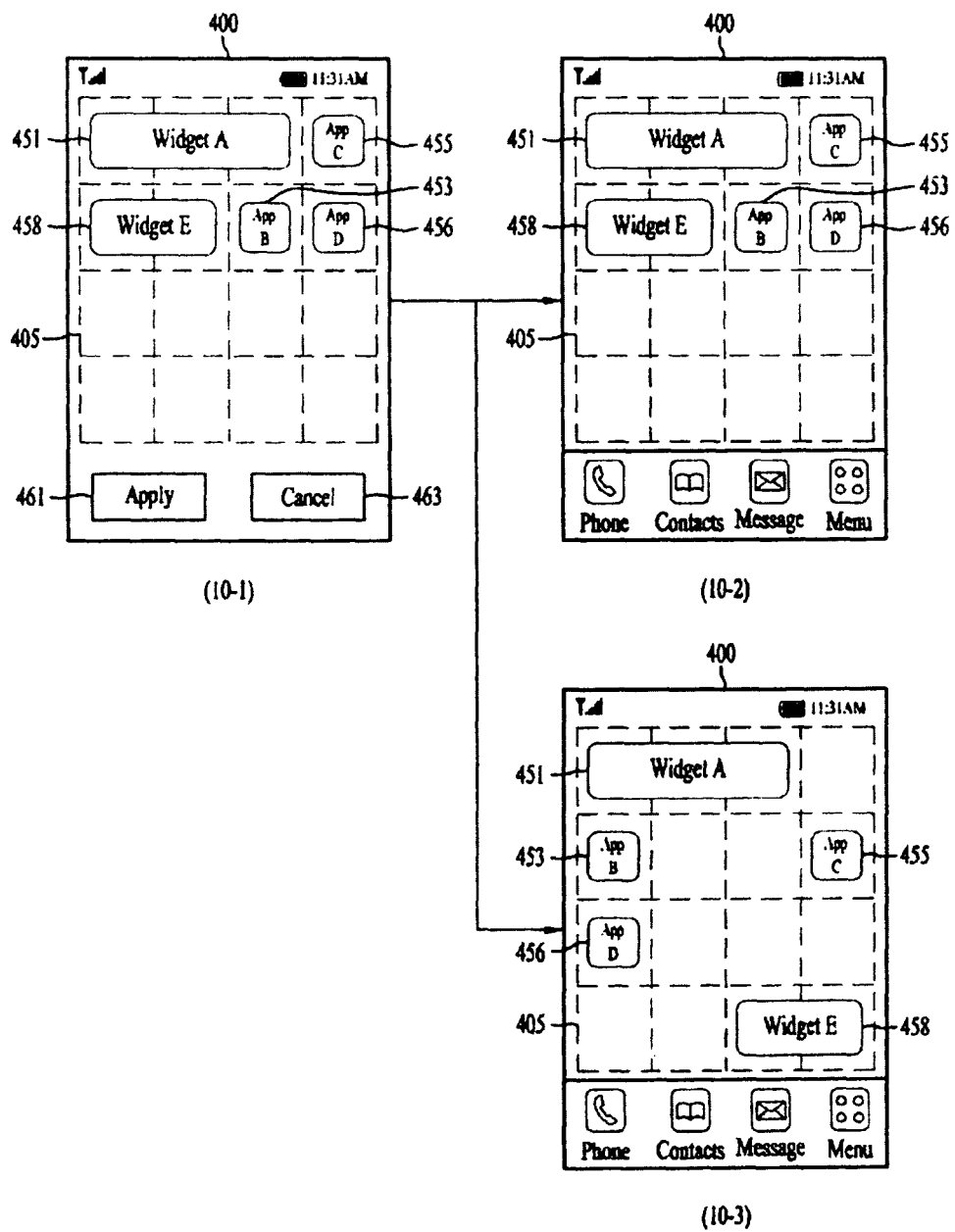

FIG. 10 is a diagram of display screen configurations to implement a method of controlling a mobile terminal according to another embodiment of the present invention. Referring to FIG. 10, as mentioned in the foregoing description with reference to FIG. 9 (9-3), after the objects have been grouped, the pointer for the touch drag gesture may be released from the touch, If so, referring to FIG. 10 (10-1), as the object rearrangement indication 407 disappears, the size of the grid 405 returns to the original size. Further, the objects in the grid 405 in the original size may be also controlled to be grouped by adhering to each other. The controller 180 controls an 'apply' icon 461 and a 'cancel' icon 463 to be displayed on the touchscreen 400 to select whether to finally apply or cancel the grouping of the objects to the home screen.

In dong so, the 'apply' icon 461 may be touched and selected. If the 'apply' icon 461 is touched and selected, referring to FIG. 10 (10-2), in response to the selection of the 'apply' icon 461, the controller 180 controls the grouping of the objects to be finally applied to the home screen.

On the other hand, the 'cancel' icon 463 may be touched and selected. If the 'cancel' icon 463 is touched and selected, referring to FIG. 10 (10-3), in response to the selection of the 'cancel' icon 463, the controller 180 controls the grouping of the objects to be cancelled.

According to the above description, when the touch drag gesture is performed, as the objects are grouped by adhering close to each other, whereby an empty space between the adhering objects in the grid 405 is removed or minimized. However, the touch drag gesture may be performed despite absence of an empty space in the grid 405. This is described in detail with reference to FIG. 11 as follows.

Figure 11:
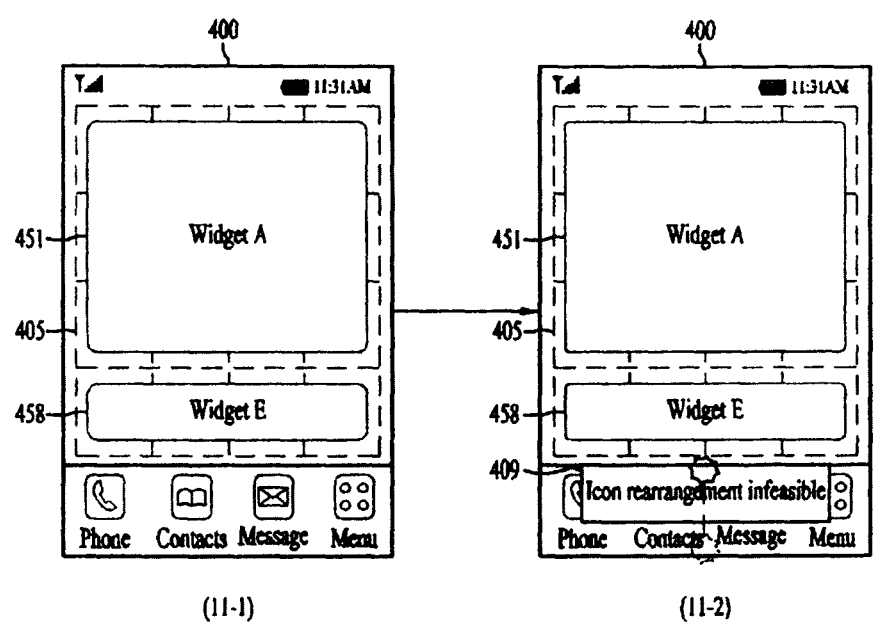

FIG. 11 is a diagram of display screen configurations to implement a method of controlling a mobile terminal according to another embodiment of the present invention.

Referring to FIG. 11 (11-1), the home screen is displayed on the touchscreen 400 (S81). Further, a plurality of objects are fully displayed within the grid 405 of the home screen without an empty space therein. In doing so, the touch drag gesture may be performed on the touchscreen 400.

However, since there is no empty space in the grid 405, referring to FIG. 11 (11-2), in response to the touch drag gesture, the controller 180 displays an indication 409 on the touchscreen 400 to indicate that the rearrangement of the objects is infeasible. Further, the controller 180 controls the grid 405 not to be reduced.

Once the touch with the pointer for the touch drag gesture is released, the controller 180 stops displaying the object rearrangement infeasibility indication 409.

According to the above description, the touch drag gesture is performed by a user touching a portion of the bottom side among the four sides of the touchscreen with the pointer and then dragging the pointer in top direction by maintaining the corresponding touch, by which the embodiment of the present invention is non-limited. For instance, the touch drag gesture may be performed when a user touches a portion of a top side among the four sides of the touchscreen with the pointer and then drags the pointer in bottom direction by maintaining the corresponding touch. This is described in detail with reference to FIG. 12 as follows.

Figure 12:
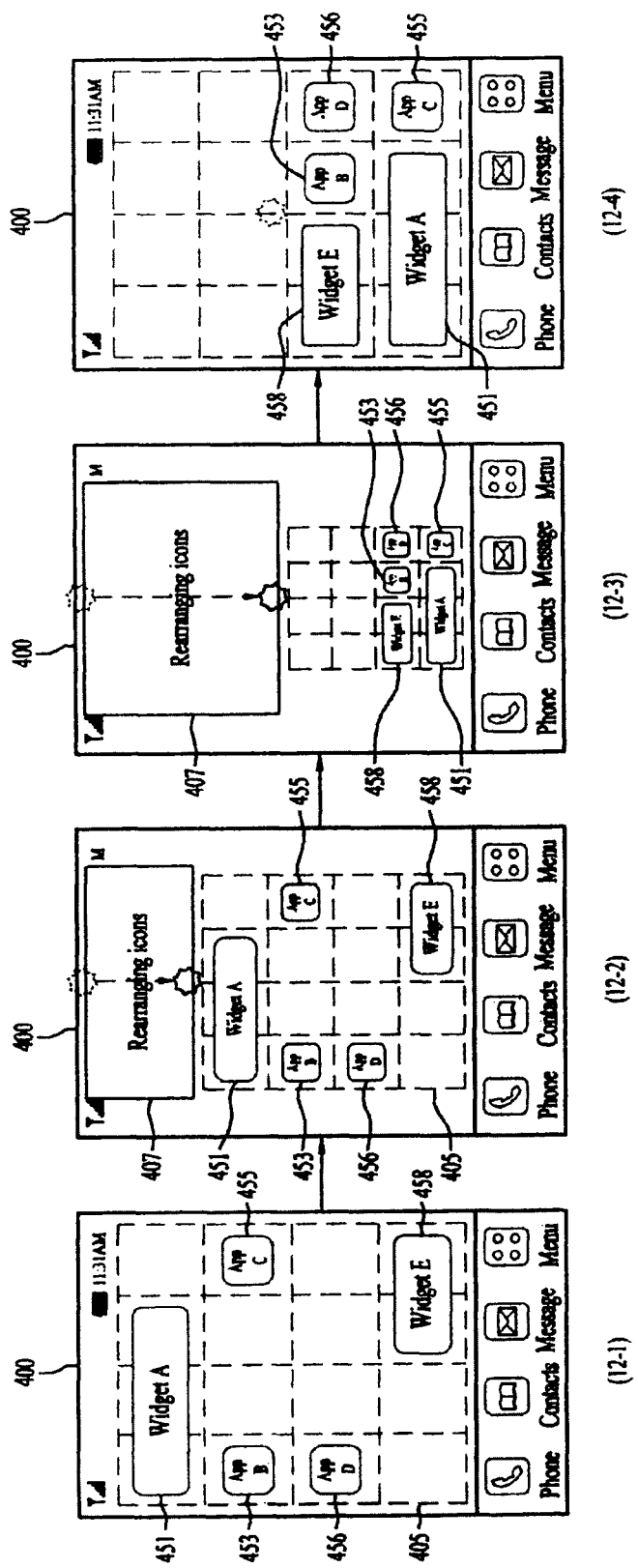

FIG. 12 is a diagram of display screen configurations to implement a method of controlling a mobile terminal according to another embodiment of the present invention. Referring to FIG. 12 (12-1), the home screen is displayed on the touchscreen 400. Further, a plurality of objects may be dispersed and displayed on the home screen.

Referring to FIG. 12 (12-2), a single touch gesture may be input to the touchscreen 400 to group the objects. FIG. 12 (12-2) shows that a user performs a touch drag gesture by touching a portion of a top side among four (4) sides of the touchscreen with the pointer and then dragging the pointer in the bottom direction by maintaining the corresponding touch.

If so, in response to the touch drag gesture, the controller 180 can determine whether a length of the touch drag gesture is greater than a prescribed threshold. If the length of the touch drag gesture is not greater than the threshold despite that the touch drag gesture is being performed, referring to FIG. 12 (12-2), the controller 180 controls a size of the object arrangement grid 405 to be gradually decreased in proportion to the length of the touch drag gesture. As the object arrangement grid 405 is reduced, the controller 180 controls the objects in the home screen to be arranged to fit the reduced object arrangement grid 405.

As the touch drag gesture keeps proceeding, the controller 180 controls an object rearrangement indication 407 to be displayed on a top end portion of the touchscreen 400 to indicate that the objects are being rearranged.

The touch drag gesture may continue to proceed. If so, in response to the ongoing touch drag gesture, the controller 180 can determine whether the length of the touch drag gesture is greater than a prescribed threshold. If the length of the touch drag gesture is greater than the threshold, referring to FIG. 12 (12-3), the controller 180 controls the objects to be automatically grouped by being arranged or sorted in the one direction on the home screen by adhering close to each other. That is, as the touch drag gesture has been performed in the top-to-bottom direction of the touchscreen 400, the objects can adhere close to each other in the top-to-bottom direction. Referring to FIG. 12 (12-3), in order for the objects to adhere further close to each other, relative positions among the objects may be changeable. This is explained in the foregoing description and its details are omitted from the following description for clarity of this specification.

If the grouping of the objects is completed, the pointer for the touch drag gesture stops moving any further and the touchscreen 400 can be released from the touch with the pointer.

If so, referring to FIG. 12 (12-4), in response to the release of the touch with the pointer, the controller 180 controls the size of the grid 405 to return to its original size as soon as the object rearrangement indication 407 disappears. Subsequently, the controller 180 controls the objects to be grouped by adhering close to each other within the grid 405 in the original size. Therefore, the grouping of the objects can be completed.

According to the above description, in response to the touch drag gesture, the objects are grouped by adhering close to each other in portrait direction (e.g., top direction and bottom direction), by which the embodiment of the present invention is non-limited. For instance, in response to the touch drag gesture, the objects may be grouped by adhering close to each other in landscape direction (e.g., right direction and left direction). This is described in detail with reference to FIG. 13 as follows.

Figure 13:
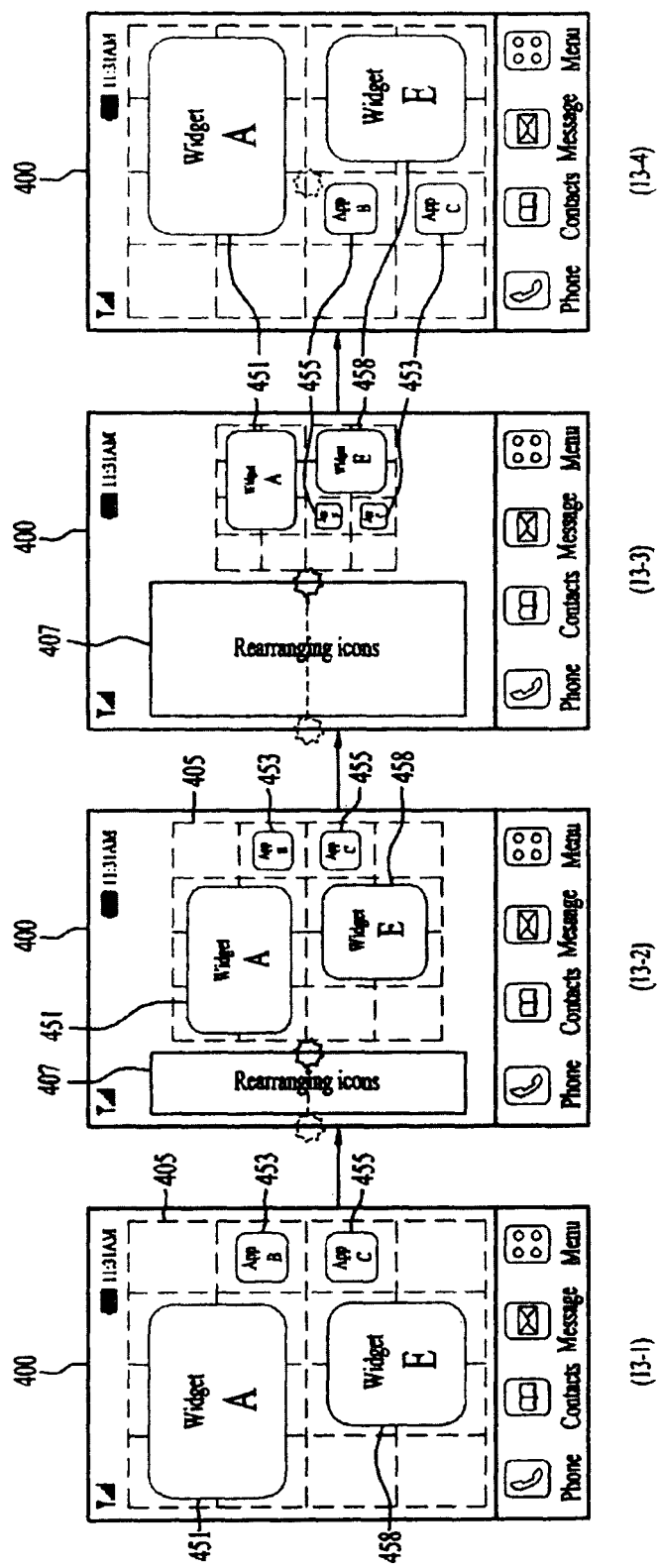

FIG. 13 is a diagram of display screen configurations to implement a method of controlling a mobile terminal according to another embodiment of the present invention. Referring to FIG. 13 (13-1), the home screen is displayed on the touchscreen 400. Further, a plurality of objects are dispersed and displayed on the home screen.

Referring to FIG. 13 (13-2), a single touch gesture is input to the touchscreen 400 to group the objects. FIG. 13 (13-2) shows that a user performs a touch drag gesture by touching a portion of a left side among four (4) sides of the touchscreen with the pointer and then dragging the pointer in right direction by maintaining the corresponding touch.

If so, in response to the touch drag gesture, the controller 180 can determine whether a length of the touch drag gesture is greater than a prescribed threshold. If the length of the touch drag gesture is not greater than the threshold despite that the touch drag gesture is being performed, referring to FIG. 13 (13-2), the controller 180 controls a size of the object arrangement grid 405 to be gradually decreased in proportion to the length of the touch drag gesture. As the object arrangement grid 405 is reduced, the controller 180 controls the objects in the home screen to be arranged to fit the reduced object arrangement grid 405.

As the touch drag gesture keep proceeding, the controller 180 controls an object rearrangement indication 407 to be displayed on a left end portion of the touchscreen 400 to indicate that the objects are being rearranged.

The touch drag gesture may continue to proceed. If so, in response to the ongoing touch drag gesture, the controller 180 can determine whether the length of the touch drag gesture is greater than a prescribed threshold. If the length of the touch drag gesture is greater than the threshold, referring to FIG. 13 (13-3), since the touch drag gesture is performed in left-to-right direction of the touchscreen 400, the controller 180 controls the objects to adhere close to each other in left-to-right direction on the home screen. Referring to FIG. 13 (13-3), in order for the objects to adhere further close to each other, relative positions among the objects may be changeable. This is explained in the foregoing description and its details are omitted from the following description for clarity of this specification.

If the grouping of the objects is completed, the pointer for the touch drag gesture stops moving any further and the touchscreen 400 can be released from the touch with the pointer.

If so, referring to FIG. 13 (13-4), in response to the release of the touch with the pointer, the controller 180 controls the size of the grid 405 to return to its original size as soon as the object rearrangement indication 407 disappears. Subsequently, the controller 180 controls the objects to be grouped by adhering close to each other within the grid 405 in the original size.

According to the above descriptions, in response to the touch drag gesture, the objects are grouped by adhering close to each other in portrait or landscape direction, by which the embodiment of the present invention is non-limited. For instance, in response to the touch drag gesture, the objects may be grouped by adhering close to each other in diagonal direction. This is described in detail with reference to FIG. 14 as follows.

Figure 14:
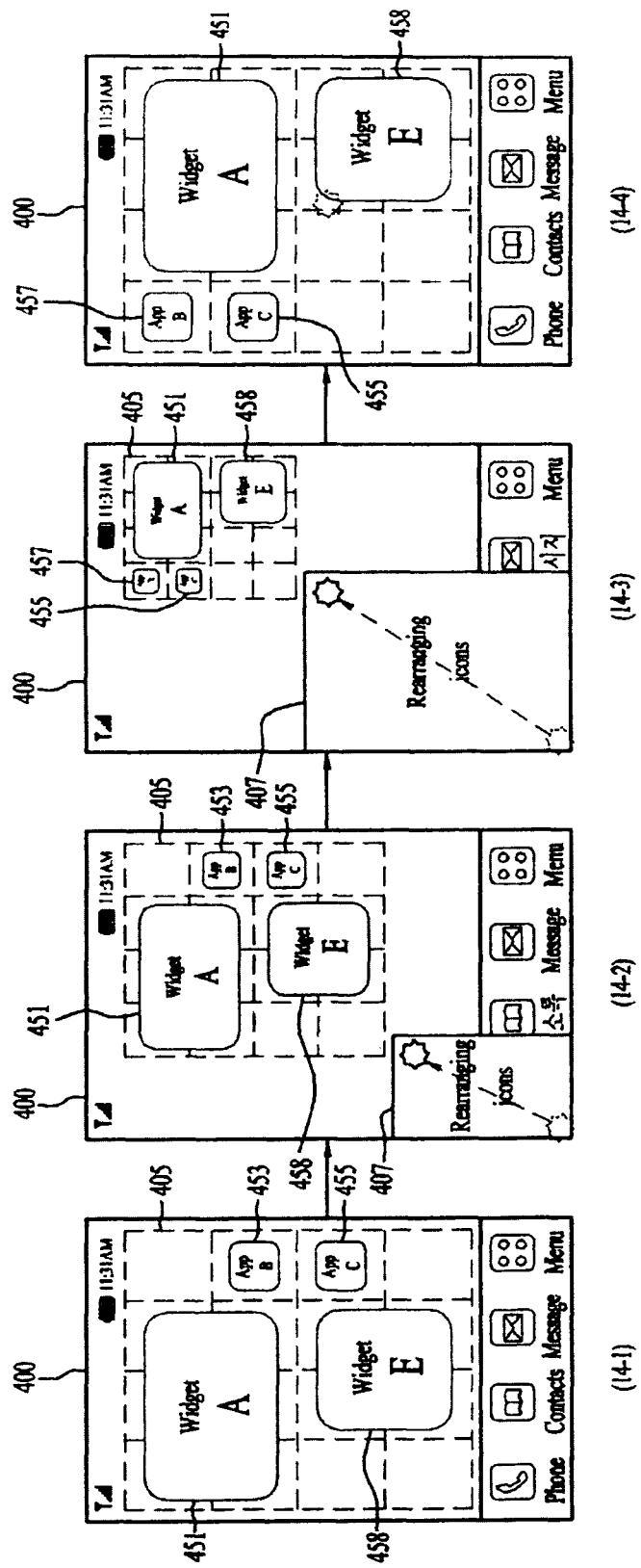

FIG. 14 is a diagram of display screen configurations to implement a method of controlling a mobile terminal according to another embodiment of the present invention. Referring to FIG. 14 (14-1), the home screen is displayed on the touchscreen 400. Further, a plurality of objects are dispersed and displayed on the home screen.

Referring to FIG. 14 (14-2), a single touch gesture is input to the touchscreen 400 to group the objects. FIG. 14 (14-2) shows that a user performs a touch drag gesture by touching a portion of a left bottom side of the touchscreen with the pointer and then dragging the pointer in right top direction by maintaining the corresponding touch.

If so, in response to the touch drag gesture, the controller 180 can determine whether a length of the touch drag gesture is greater than a prescribed threshold. If the length of the touch drag gesture is not greater than the threshold despite that the touch drag gesture is being performed, referring to FIG. 14 (14-2), the controller 180 controls a size of the object arrangement grid 405 to be gradually decreased in proportion to the length of the touch drag gesture. As the object arrangement grid 405 is reduced, the controller 180 controls the objects in the home screen to be arranged to fit the reduced object arrangement grid 405.

As the touch drag gesture keep proceeding, the controller 180 controls an object rearrangement indication 407 to be displayed on a left bottom end portion of the touchscreen 400 to indicate that the objects are being rearranged.

The touch drag gesture may continue to proceed. If so, in response to the ongoing touch drag gesture, the controller 180 can determine whether the length of the touch drag gesture is greater than a prescribed threshold. If the length of the touch drag gesture is greater than the prescribed threshold, referring to FIG. 14 (14-3), since the touch drag gesture is performed in left bottom end portion to right top end portion direction of the touchscreen 400, the controller 180 controls the objects to adhere close to each other in left bottom end portion to right top end portion direction on the home screen. Referring to FIG. 14 (14-3), in order for the objects to adhere further close to each other, relative positions among the objects may be changeable. This is explained in the foregoing description and its details are omitted from the following description for clarity of this specification.

If the grouping of the objects is completed, the pointer for the touch drag gesture stops moving any further and the touchscreen 400 can be released from the touch with the pointer.

If so, referring to FIG. 14 (14-4), in response to the release of the touch with the pointer, the controller 180 controls the size of the grid 405 to return to its original size as soon as the object rearrangement indication 407 disappears. Subsequently, the controller 180 controls the objects to be grouped by adhering close to each other within the grid 405 in the original size.

According to the above descriptions, when a specific touch gesture is performed on the touchscreen, the grouping of the objects is performed, by which the embodiment of the present invention is non-limited. For instance, the grouping of the objects can be performed if another user command is input as well as the touch gesture. This is described in detail with reference to FIG. 14 as follows.

Figure 15:
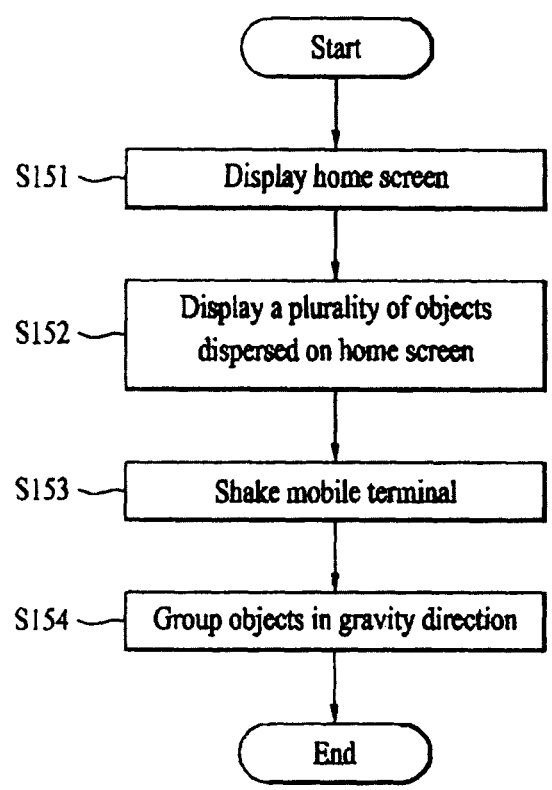
FIG. 15 is a flowchart illustrating a method of controlling a mobile terminal according to another embodiment of the present invention.

FIG. 15 is a flowchart illustrating a method of controlling a mobile terminal according to another embodiment of the present invention. Further, FIG. 16 is a diagram of display screen configurations to implement a method of controlling a mobile terminal according to another embodiment of the present invention.

Figure 16:
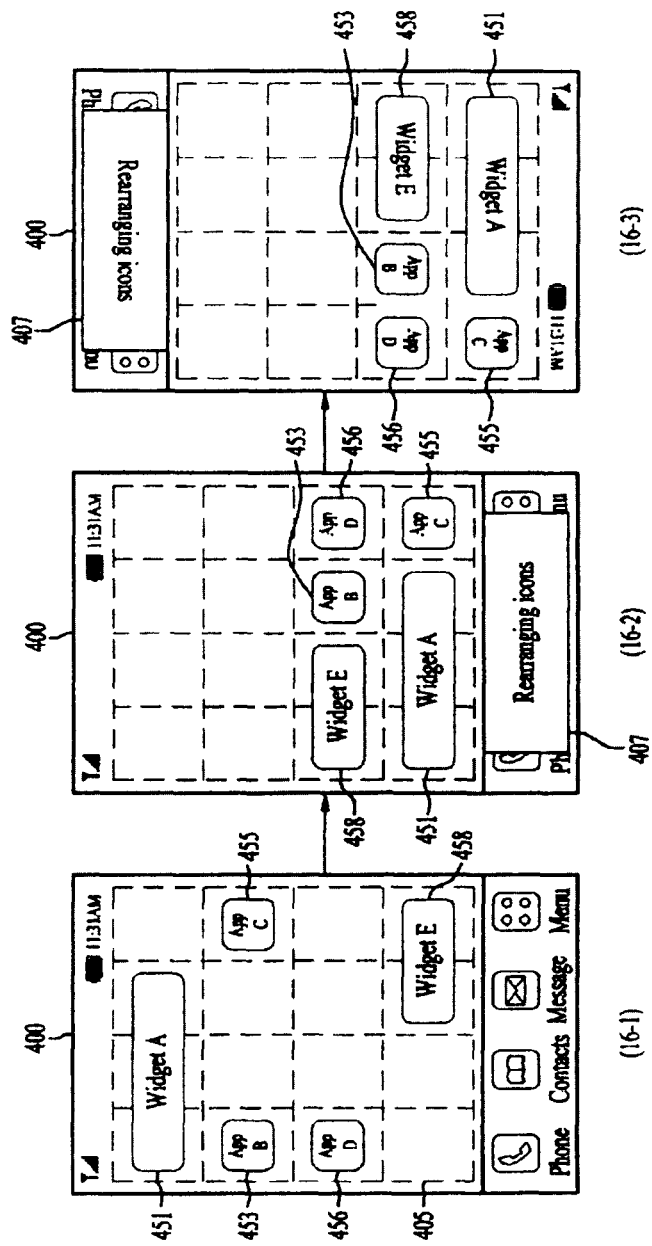
FIG. 16 is a diagram of display screen configurations to implement a method of controlling a mobile terminal according to another embodiment of the present invention.

Referring to FIG. 16 (16-1), the home screen is displayed on the touchscreen 400 and a plurality of objects are dispersed and displayed on the home screen (S151, S152). In dong so, a user shake the mobile terminal preset number of times (e.g., once, etc.). Further, the shaking may be performed by shaking the mobile terminal in a specific direction (e.g., front-rear direction of the display unit 151, top-bottom direction of the display unit 151, right-left direction of the display unit 151, etc.) (S153).

If so, the controller 180 detects the shaking(s) via the sensing unit 141 and can sense a direction of gravity applied to the mobile terminal in accordance with a direction of a space occupied by the mobile terminal Subsequently, in response to the detected shaking(s), referring to FIG. 16 (16-2), the controller 180 controls the objects to be grouped by adhering close to each other in the sensed gravity direction (i.e., a bottom direction of the touchscreen 400) (S154).

Referring to FIG. 16 (16-3), a user may turn or place the mobile terminal upside down by 180 degrees. If so, the controller 180 detects a direction of the gravity applied to the mobile terminal again and can then control the objects to be grouped again by adhering close to each other in the sensed gravity direction (i.e., a top direction of the touchscreen 400), as shown in FIG. 16 (16-3) (S154).

Thereafter, the user shakes the whole mobile terminal again. If so, referring to FIG. 16 (16-3), the controller 180 keeps the objects adhering close to each other and controls the objects not to move to adhere close to each other any further in the direction of gravity applied in accordance with the changed space occupying direction of the mobile terminal.

According to the above description, if a specific touch gesture or shaking is performed on the touchscreen, all objects within the home screen (or grid) are grouped altogether or adhere close to each other, by which the present embodiment is non-limited. For instance, the rest of the objects except a specific object selected by a user may adhere close to each other. This is described in detail with reference to FIG. 17 and FIG. 18 as follows.

Figure 17:
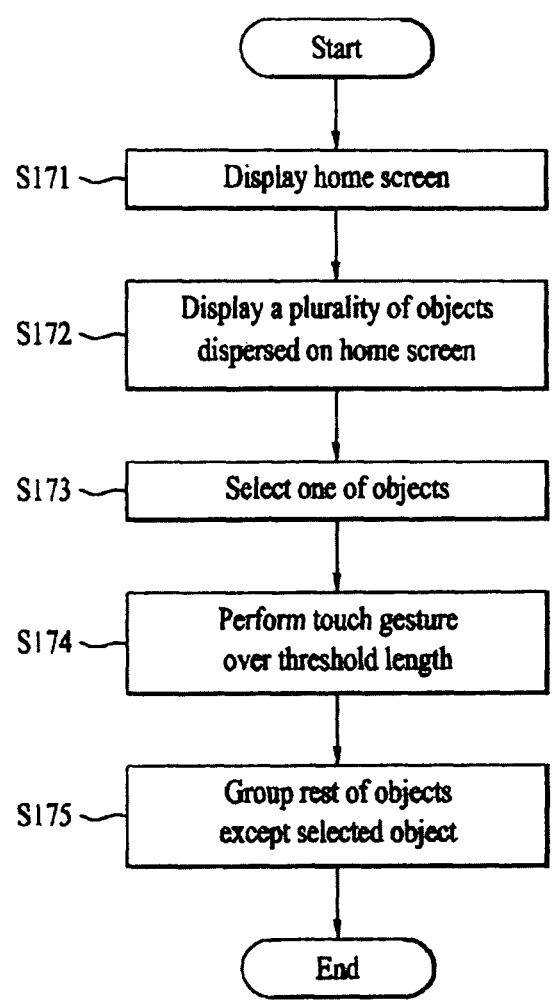
FIG. 17 is a flowchart illustrating a method of controlling a mobile terminal according to another embodiment of the present invention.

FIG. 17 is a flowchart illustrating a method of controlling a mobile terminal according to another embodiment of the present invention. Further, FIG. 18 is a diagram of display screen configurations to implement a method of controlling a mobile terminal according to another embodiment of the present invention.

Figure 18:
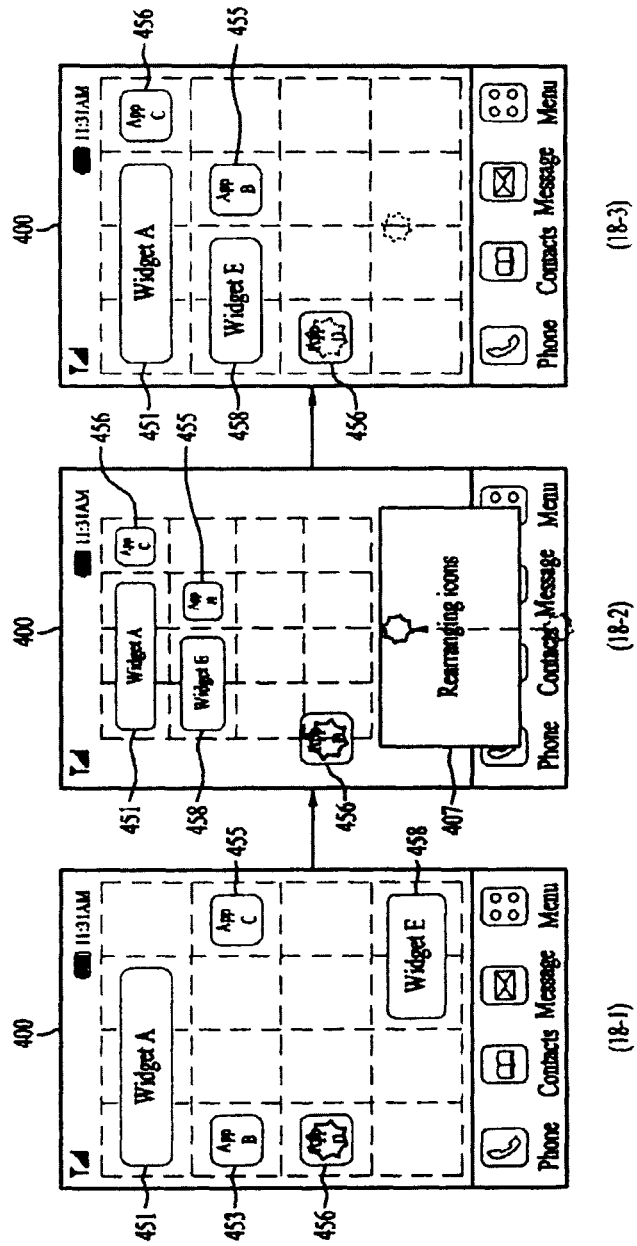
FIG. 18 is a diagram of display screen configurations to implement a method of controlling a mobile terminal according to another embodiment of the present invention.

Referring to FIGS. 17 and 18, as mentioned in the foregoing description, the home screen may be displayed on the touchscreen 400 and a plurality of objects may be dispersed and displayed on the home screen (S171, S172). In doing so, a user can touch and select a desired object from a plurality of the objects using a $1^{st}$ pointer (e.g., a left hand finger, etc.) (S173).

While the user is selecting the desired object with the $1^{st}$ pointer (or after the desired object has been selected), the user can input a user command for grouping the objects (S174). For one example of the user command, referring to FIG. 18 (18-1) and FIG. 18 (18-2), the user can perform a touch drag gesture of a length equal to or greater than a prescribed threshold on the touchscreen using a $2^{nd}$ pointer (e.g., a right hand finger, etc.). For example of the user command, a shaking may be performed on the mobile terminal.

If so, in response to the selection of the desired object and the user command, referring to FIG. 18 (18-3), the controller 180 controls the rest of the objects except the desired object to be grouped by adhering close to each other (S175). Since the process for grouping the objects to adhere close to each other is explained in the foregoing description, its details are omitted from the following description for clarity.

According to the above description, the rest of the objects except at least one object are grouped by adhering close to each other, by which the present embodiment is non-limited. For instance, while at least two desired objects are touched and selected using at least two pointers (e.g., left had index and middle fingers, etc.) (or after at least two desired objects have been selected), if a user command for grouping the objects is input, the controller 180 controls the rest of the objects except the at least two desired objects to be grouped by adhering close to each other.

According to the above descriptions, when the objects adhere close to each other, the objects are arranged in one direction of the grid as intense as possible, by which embodiments of the present embodiment is non-limited. For instance, a desired cell of the grid may adhere close not to be occupied the objects. This is described in detail with reference to FIG. 19 and FIG. 20 as follows.

Figure 19:
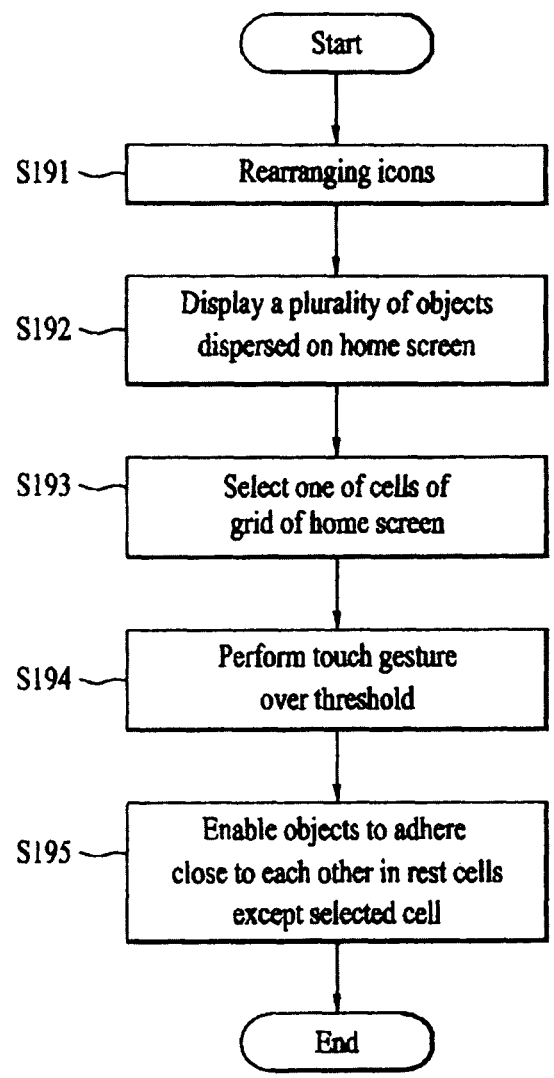
FIG. 19 is a flowchart illustrating a method of controlling a mobile terminal according to another embodiment of the present invention.

FIG. 19 is a flowchart illustrating a method of controlling a mobile terminal according to another embodiment of the present invention. Further, FIG. 20 is a diagram of display screen configurations to implement a method of controlling a mobile terminal according to another embodiment of the present invention.

Figure 20:
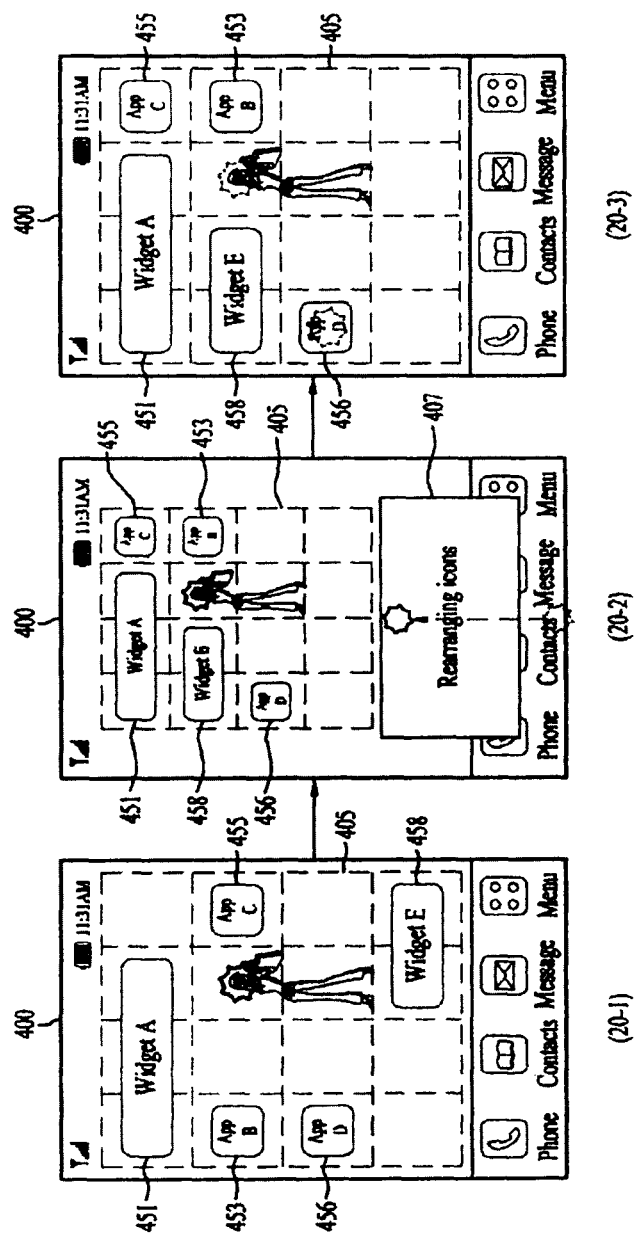
FIGS. 20 to 22 are diagrams of display screen configurations to implement a method of controlling a mobile terminal according to another embodiment of the present invention.

Referring to FIGS. 19 and 20, as mentioned in the foregoing description, the home screen is displayed on the touchscreen 400 and a plurality of objects are dispersed and displayed on the home screen (S191, S192). As mentioned in the foregoing description, the object arrangement grid 405 may exist within the home screen. Further, a background image may be displayed on the home screen.

A user can touch and select a desired cell from a plurality of cells within the grid 405 using a $1^{st}$ pointer (e.g., a left hand finger, etc.) (S193). For instance, the desired cell may correspond to a specific portion (e.g., a human face, etc.) of the background image.

While the user is selecting the desired cell with the $1^{st}$ pointer (or after the desired cell has been selected), the user can input a user command for grouping the objects (S194). For one example of the user command, referring to FIG. 20 (20-1) and FIG. 20 (20-2), the user can perform a touch drag gesture of a length equal to or greater than a prescribed threshold on the touchscreen using a $2^{nd}$ pointer (e.g., a right hand finger, etc.). As the touch drag is performed, when a size of the grid 405 is decreased, a size of the background image can be decreased together in proportion. For another example of the user command, a shaking may be performed on the mobile terminal.

If so, in response to the selection of the desired cell and the user command, referring to FIG. 20 (20-3), the controller 180 controls the objects to be grouped by adhering close to each other by avoiding being arranged at the desired cell (S195).

According to the above description, the objects are grouped by adhering close to each other by avoiding being arranged at one of a plurality of cells of the grid, by which the present embodiment is non-limited. For instance, while at least two desired cells are touched and selected using at least two pointers (e.g., left had index and middle fingers, etc.) (or after at least two desired objects have been selected), if a user command for grouping the objects is input, the controller 180 controls the objects to be grouped by adhering close to each other by avoiding being arranged at the at least two desired cells among a plurality of the cells.

In the following description, another method for the objects to adhere close to each other by avoiding occupying a desired cell in the grid is explained in detail with reference to FIG. 21.

Figure 21:
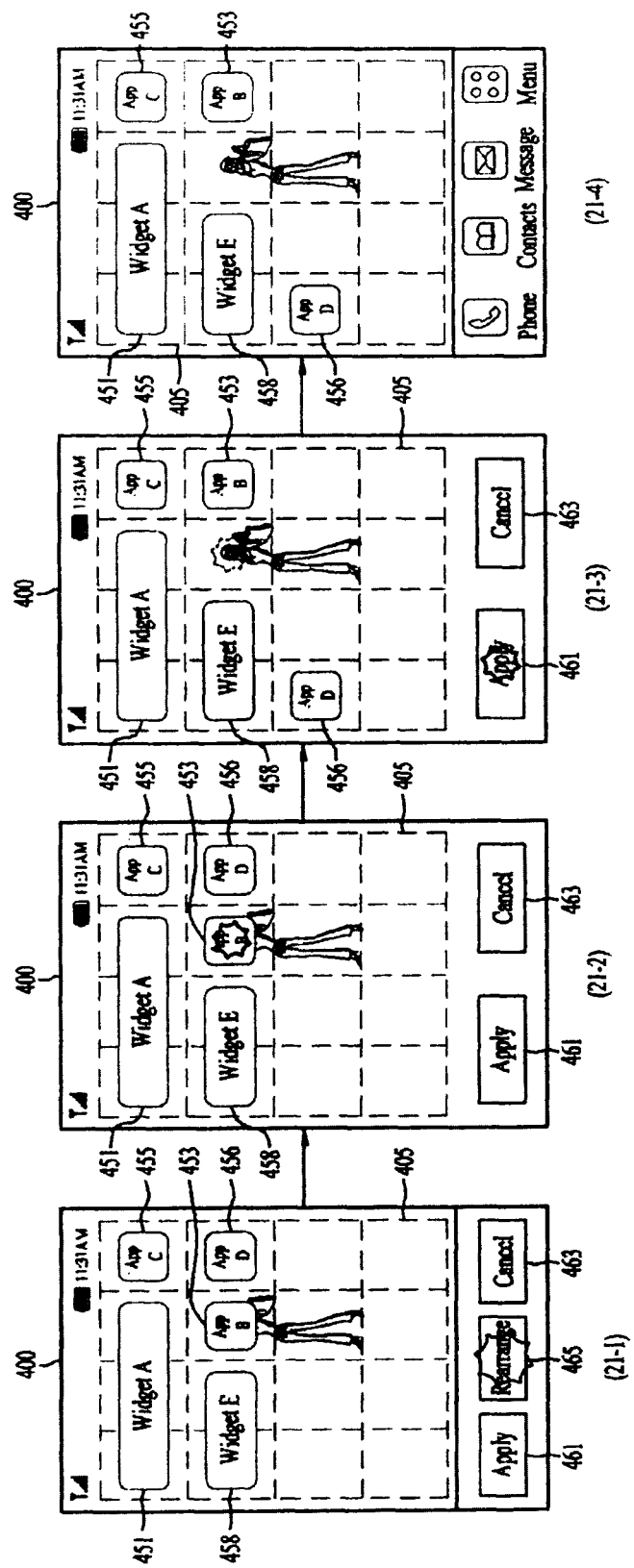

FIG. 21 is a diagram of display screen configurations to implement a method of controlling a mobile terminal according to another embodiment of the present invention.

As mentioned in the foregoing description, when the touch drag gesture for grouping the objects is cancelled by releasing the corresponding touch (or when the mobile terminal shaking is performed), an icon 'apply' 461 and an icon 'cancel' 463 may be displayed on the touchscreen to select whether to finally apply the grouping of the objects to the home screen or to cancel the grouping of the objects.

In doing so, referring to FIG. 21 (21-1), an icon 'rearrange' 465 for rearrangement of the objects adhering close to each other may be further displayed on the touchscreen 400 together with the icon 'apply' 461 and the icon 'cancel' 463.

Referring to FIG. 21 (21-1) and FIG. 21 (21-2), a user touches and selects the icon 'rearrange' 465 and can then touch and select at least one or more desired cells from a plurality of cells occupied by the adhering objects. In doing so, the at least one or more desired cells may be selected by being touched simultaneously or sequentially.

If so, referring to FIG. 21 (21-3), in response to the selection of the icon 'rearrange' 465 and the selection of the desired cell, the controller 180 controls the object occupying the selected desired cell to move to another cell. That is, the controller 180 can control the objects to be rearranged by grouping the objects to adhere close to each other by preventing the selected desired cell from being occupied by the object(s).

The icon 'apply' 461 may be touched and selected. If so, in response to the selection of the icon 'apply' 461, referring to FIG. 21 (21-4), the controller 180 controls the rearrangement of the objects to be finally applied to the home screen.

According to the above description, when the objects are grouped by adhering close to each other, if a specific cell is manually selected from the grid by a user, the objects are not arranged at the specific cell, by which the present invention is non-limited.

For instance, when a user command for grouping the objects in a manner that the objects adhere close to each other is input, the controller automatically recognizes a pattern of a specific portion (e.g., a human face, etc.) of a background image of the home screen and controls the objects to adhere close to each other by preventing the objects from being automatically arranged at cell(s) of the grid corresponding to the pattern-recognized specific portion.

Alternatively, in the background image, the specific portion may be tagged (to indicate that it is the specific portion) by a user or an image provider in advance before the background image is used for the home screen. In this instance, the controller 180 needs not to perform the pattern recognition for the specific portion but controls the objects to adhere close to each other by preventing the objects from being automatically arranged at cell(s) of the grid corresponding to the specific portion.

According to the above descriptions, the objects are grouped by adhering close to each other in one direction within the grid of the home screen, by which the present embodiment is non-limited. For instance, the objects may be grouped on the home screen by being categorized into folders, to each of which the objects having the same attribute belong. This is described in detail with reference to FIG. 22 as follows.

Figure 22:
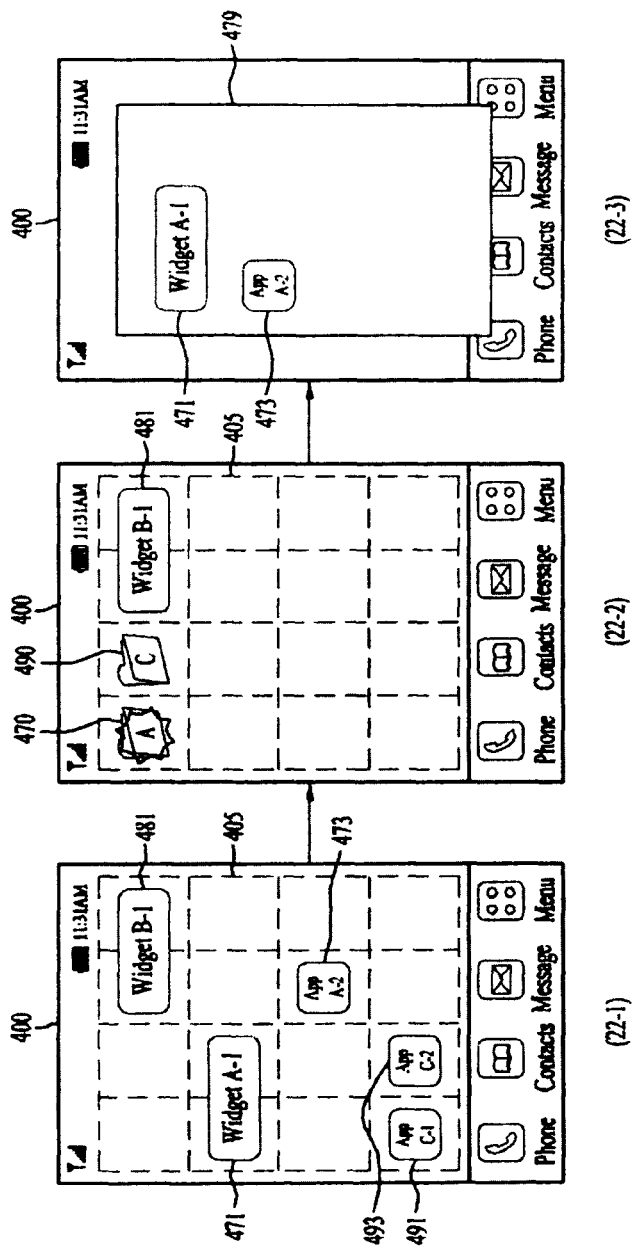

FIG. 22 is a diagram of display screen configurations to implement a method of controlling a mobile terminal according to another embodiment of the present invention.

First of all, an attribute of an object is explained as follows. The attribute may include a category of an application previously given by an application creator (or provider) when the application is created. For example, the application category may include one of health, game, economy, education, weather, navigation, news, music, travel, entertainment and the like, by which the present invention is non-limited. For instance, a specific category can be given to an object (e.g., app icon, widget, etc.) of an application belonging to the specific category. That is, if the object just belongs to the same category, it may be understood as having the same attribute irrespective of whether the object is an app icon or a widget. Alternatively, even if the object belongs to the same category, it may have a different attribute in accordance with whether the object is an app icon or a widget.

The attribute to be the category does not always have to be given by an application creator (or provider) in advance. For instance, when a user saves the objects (e.g., app icons and/or widgets) in the memory 160 of the mobile terminal 100 by categorizing the objects into several folders, the objects belonging to the same folder may be regarded as having the same attribute. That is, the attribute of the object may be designated by the user.

In the following description, a method of folderizing the objects to group by attributes is explained.

Referring to FIG. 22 (22-1), as mentioned in the foregoing description, the home screen is displayed on the touchscreen 400 and a plurality of objects are dispersed and displayed on the home screen. In FIG. 22 (22-1), assume that a widget A-1 471 and an app A-2 473 have the same attribute (e.g., a game category, etc.), that an app C-1 491 and an app C-2 493 have the same attribute (e.g., a music category), and that a widget B-1 481 has an attribute (e.g., a news category, etc.) different from that of other objects. In this instance, the alphabet A, B or C written next to the app or widget may be understood as a sign to indicate a corresponding attribute.

A user command (e.g., a touch gesture, a mobile terminal shaking, etc.) for the grouping of the objects mentioned in the foregoing description may be input.

If so, referring to FIG. 22 (22-2), in response to the user command for the grouping of the objects, the controller 180 controls the objects of the same attribute to be folderized on the home screen. For instance, a folder A 470 corresponding to the widget A-1 471 and the app A-2 473 is created on the home screen and the widget A-1 471 and the app A-2 473 may be then moved into the created folder A 470. A folder C 490 corresponding to the app C-1 491 and the app C-2 493 is created on the home screen and the app C-1 491 and the app C-2 493 may be then moved into the created folder C 490. However, since there is no other objects having the same attribute of the widget B-1 481, the corresponding widget B-1 481 may not be folderized.

The controller 180 controls the folder A 470, the folder C 490 and the widget B-1 481 displayed on the home screen to adhere close to each other in one direction. If the objects are folderized, the objects may be regarded as being grouped regardless of whether the folders are adhere close to each other in one direction. Alternatively, after the objects have been folderized, when the objects adhere close to each other in one direction, the objects may be regarded as grouped.

The user may touch and select the folder A 470. If so, referring to FIG. 22 (22-3), the controller 180 can display a window 479 of the folder A 470. It is a matter of course that the widget A-1 471 and the app A-2 473 are displayed within the window 371. Hence, the user can touch, select and activate a desired object within the window 471.

According to the above description, the objects are grouped within a single home screen, by which the embodiment of the present embodiment is non-limited. For instance, the objects may be grouped across at least two home screens. This is described in detail with reference to FIGS. 23 to 25 as follows.

Figure 23:
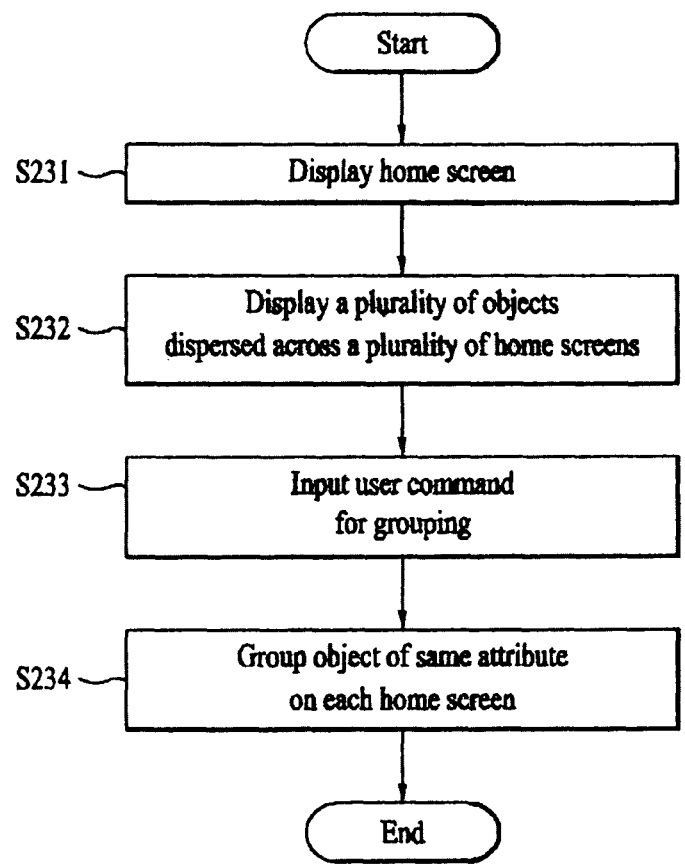
FIG. 23 is a flowchart illustrating a method of controlling a mobile terminal according to a further embodiment of the present invention.
Figure 24:
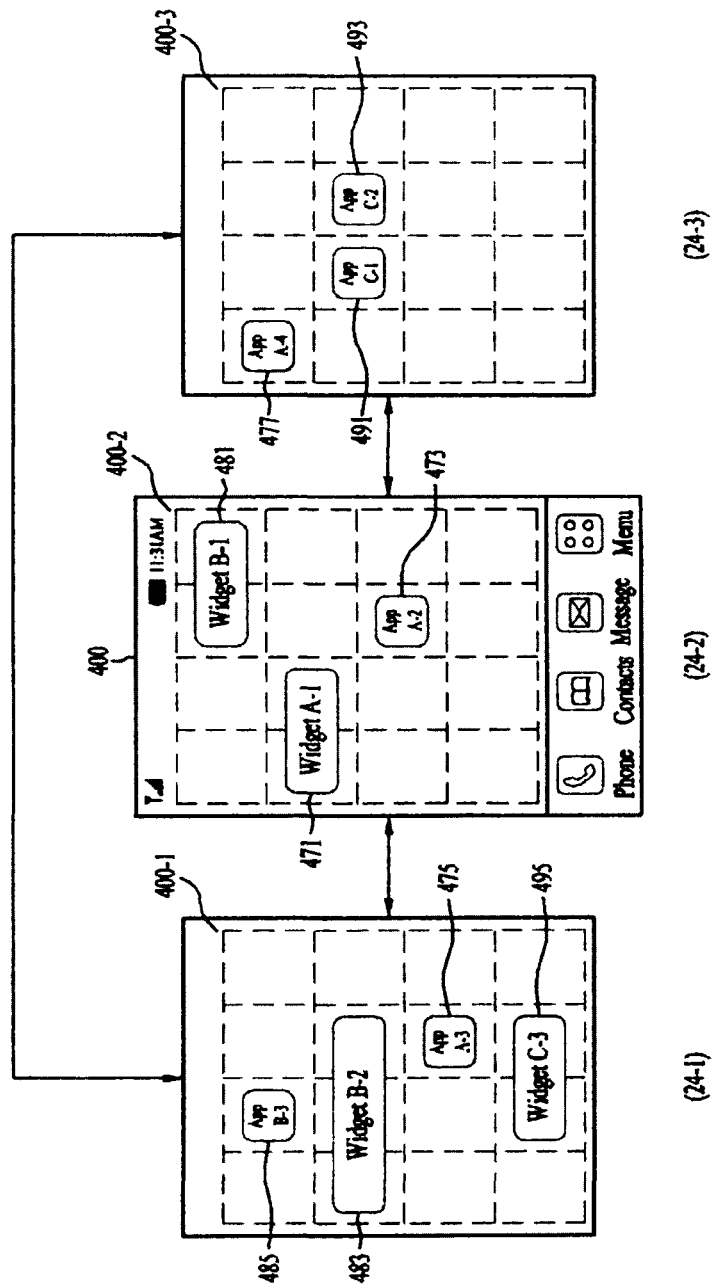
FIGS. 24 to 31 are diagrams of display screen configurations to implement a method of controlling a mobile terminal according to a further embodiment of the present invention.
Figure 25:
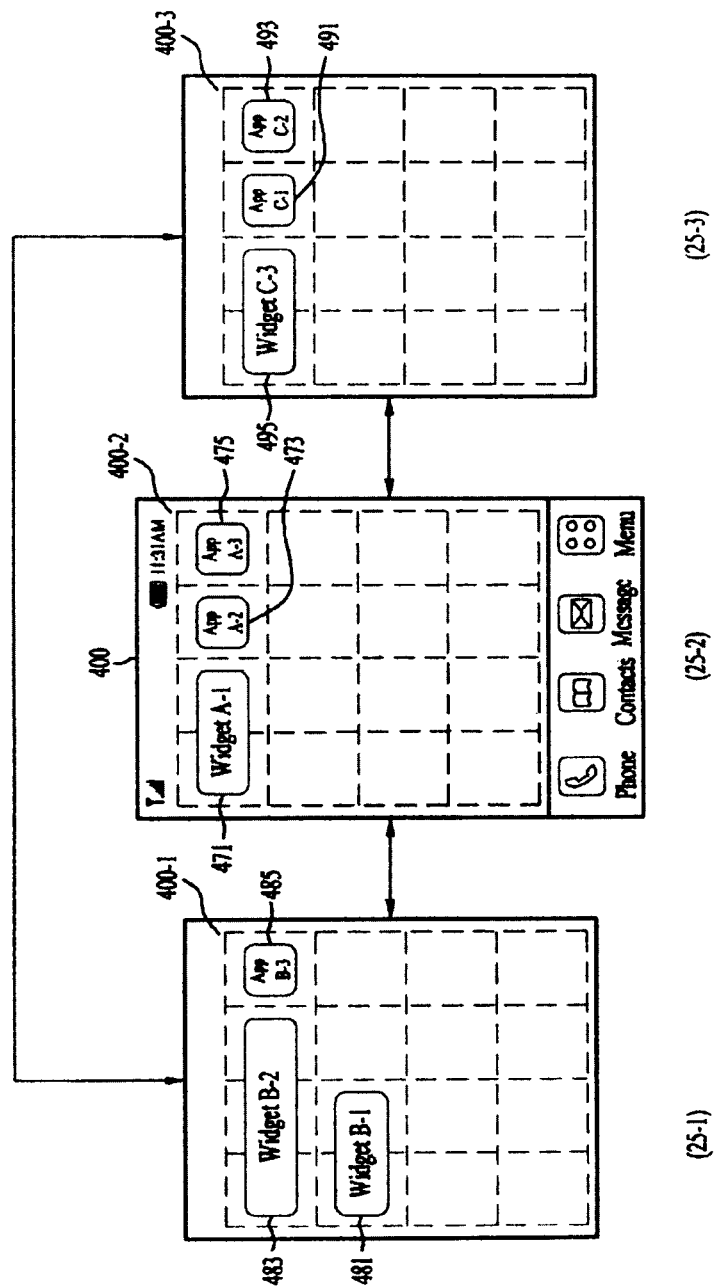

FIG. 23 is a flowchart illustrating a method of controlling a mobile terminal according to a further embodiment of the present invention. FIGS. 24 and 25 are diagrams of display screen configurations to implement a method of controlling a mobile terminal according to a further embodiment of the present invention.

Referring to FIGS. 23 and 24, at least two or more home screens are previously prepared in the mobile terminal 100 (S231). For example, FIG. 24 (24-1) shows a $1^{st}$ home screen 400-1, FIG. 24 (24-2) shows a $2^{nd}$ home screen 400-2, and FIG. 24 (24-3) shows a $3^{rd}$ home screen 400-3. FIG. 24 shows one example that the $2^{nd}$ home screen among the $1^{st}$ to $3^{rd}$ home screens is displayed on the touchscreen 400. If an appropriate touch gesture (e.g., a left touch flicking, a right touch flicking, etc.) is input to the touchscreen 400, the controller 180 controls the $1^{st}$ to $3^{rd}$ home screens 400-1 to 400-3 to be sequentially displayed on the touchscreen 400.

For example shown in FIG. 24, objects of the attribute A mostly exist in the $2^{nd}$ home screen 400-2, objects of the attribute B mostly exist in the $1^{st}$ home screen 400-1, and objects of the attribute C mostly exist in the $3^{rd}$ home screen 400-3.

Referring to FIG. 24, a plurality of objects are dispersed and exist in the $1^{st}$ to $3^{rd}$ home screens 400-1 to 400-3 (S232). A user command (e.g., a touch gesture, a mobile terminal shaking, etc.) for the grouping of the objects may be then input.

In response to the input user command, referring to FIG. 25, the controller 180 can control the objects of the same attribute to be grouped by gathering to adhere close to each other on each of the home screens. That is, on the $1^{st}$ home screen 400-1 in which the attribute B used to exist mostly before the grouping, referring to FIG. 25 (25-1), the objects 481, 483 and 485 of the attribute B existing across the $1^{st}$ to $3^{rd}$ home screens 400-1 to 400-3 are grouped by gathering to adhere close to each other.

On the $2^{nd}$ home screen 400-2 in which the attribute A used to exist mostly before the grouping, referring to FIG. 25 (25-2), the objects 471, 473 and 475 of the attribute A existing across the $1^{st}$ to $3^{rd}$ home screens 400-1 to 400-3 are grouped by gathering to adhere close to each other.

On the $3^{rd}$ home screen 400-3 in which the attribute C used to exist mostly before the grouping, referring to FIG. 25 (25-3), the objects 491, 493 and 495 of the attribute C existing across the $1^{st}$ to $3^{rd}$ home screens 400-1 to 400-3 are grouped by gathering to adhere close to each other.

According to the description with reference to FIGS. 24 and 25, the number of the attributes of the objects is equal to the number of the home screens before the grouping. However, it may happen that the number of the attributes of the objects is greater than the number of the home screens before the grouping. This is described in detail with reference to FIGS. 26 and 27 as follows.

Figure 26:
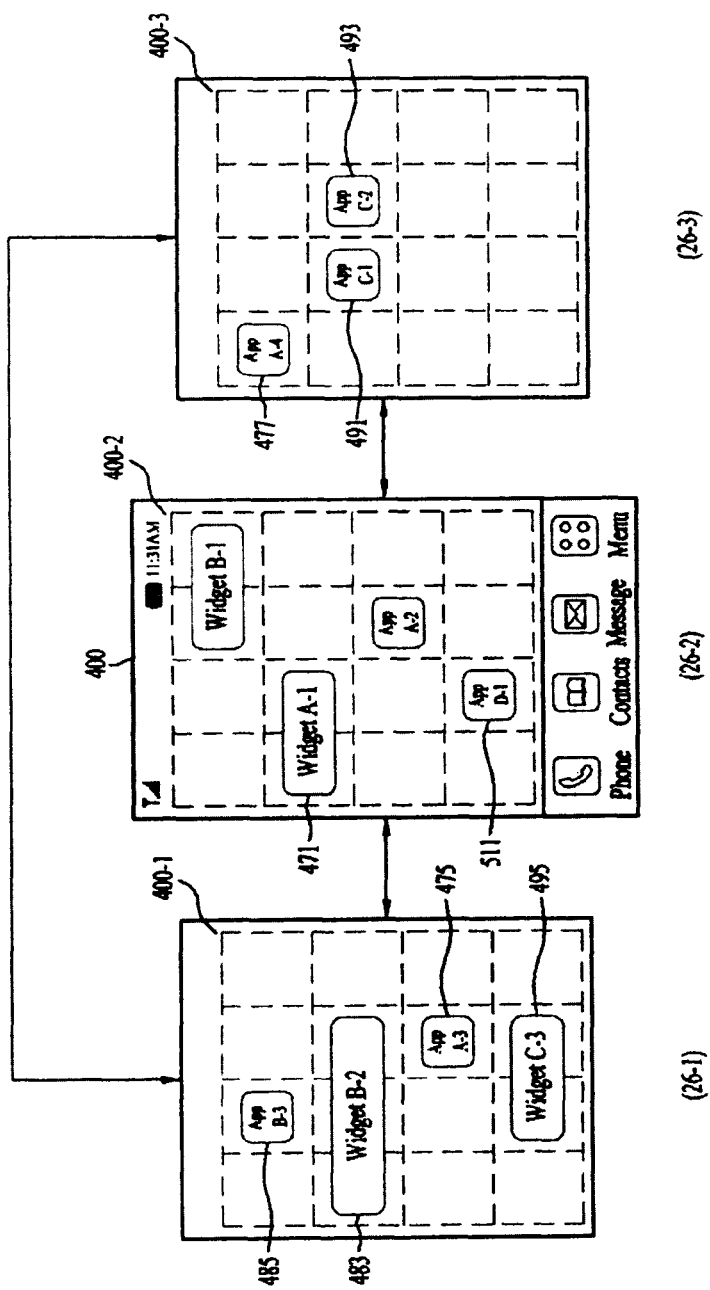
Figure 27:
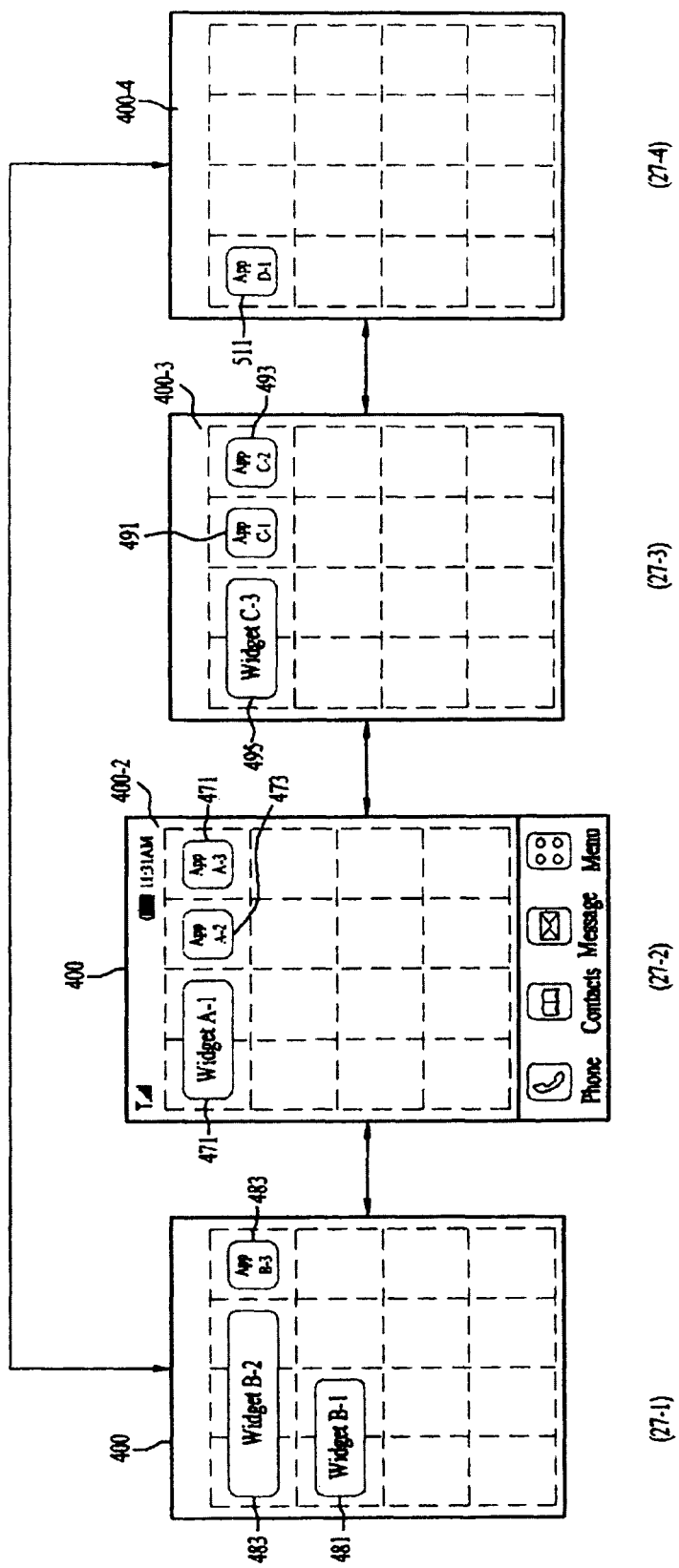

FIGS. 26 and 27 are diagrams of display screen configurations to implement a method of controlling a mobile terminal according to a further embodiment of the present invention.

Referring to FIG. 26, $1^{st}$ to $3^{rd}$ home screens 400-1 to 400-3 may be previously prepared in the mobile terminal 100 (S231). In particular, objects, each of which has one of four (4) attributes (i.e., an attribute A, an attribute B, an attribute C and an attribute D), may be dispersed across the $1^{st}$ to $3^{rd}$ home screens 400-1 to 400-3. In particular, the number of the attributes of the objects may be greater than the number of the home screens.

A user command (e.g., a touch gesture, a mobile terminal shaking, etc.) for the grouping of the objects may be input. In response to the input user command, referring to FIG. 27, the controller 180 can create a $4^{th}$ home screen 400-4 to equalize the number of the home screens and the number of the attributes of the objects and controls the objects to be grouped in which the objects of the same attribute gather to adhere close to each other on each of the home screens.

As the objects grouped on the $1^{st}$ to $3^{rd}$ home screens 400-1 to 400-3 are identical those described with reference to FIG. 25, their details are omitted from the following description. On the newly created $4^{th}$ home screen 400-4, an object 511 of the attribute D existing across all the home screens may be grouped by gathering to adhere close to each other.

Meanwhile, it may happen that the number of the attributes of the objects is smaller than the number of the home screens before the grouping. This is described in detail with reference to FIGS. 28 and 29 as follows.

Figure 28:
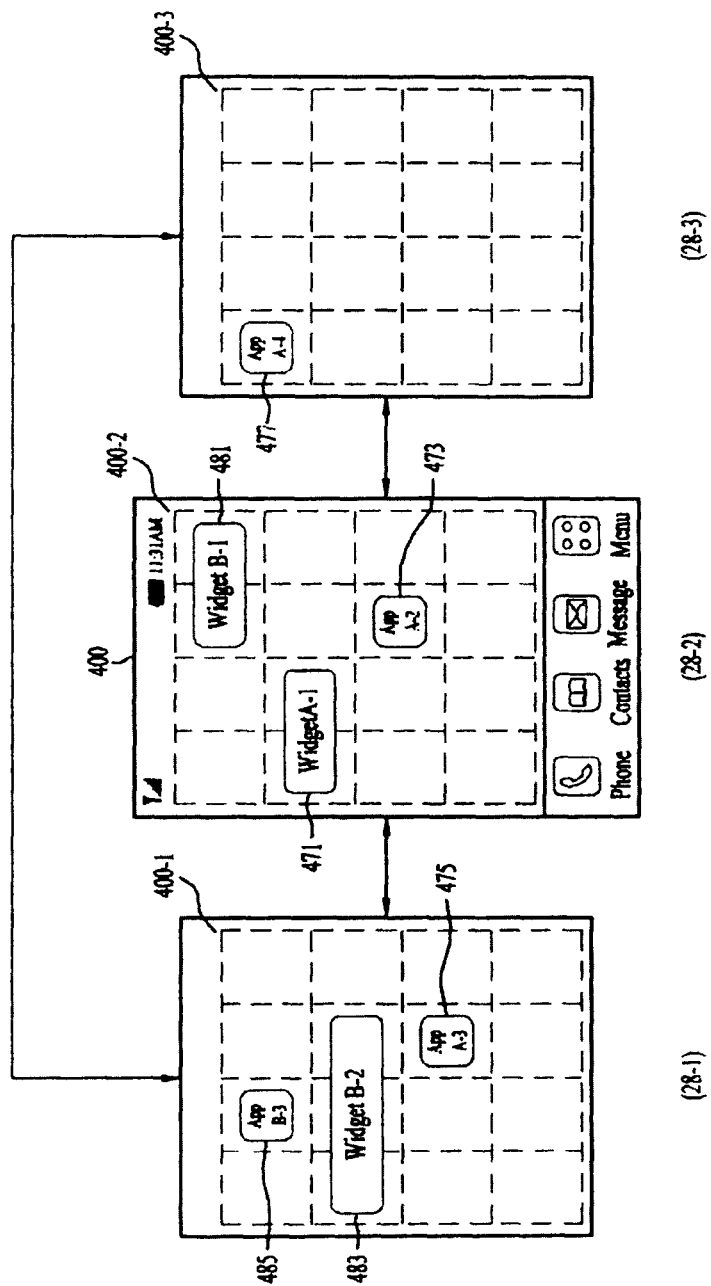
Figure 29:
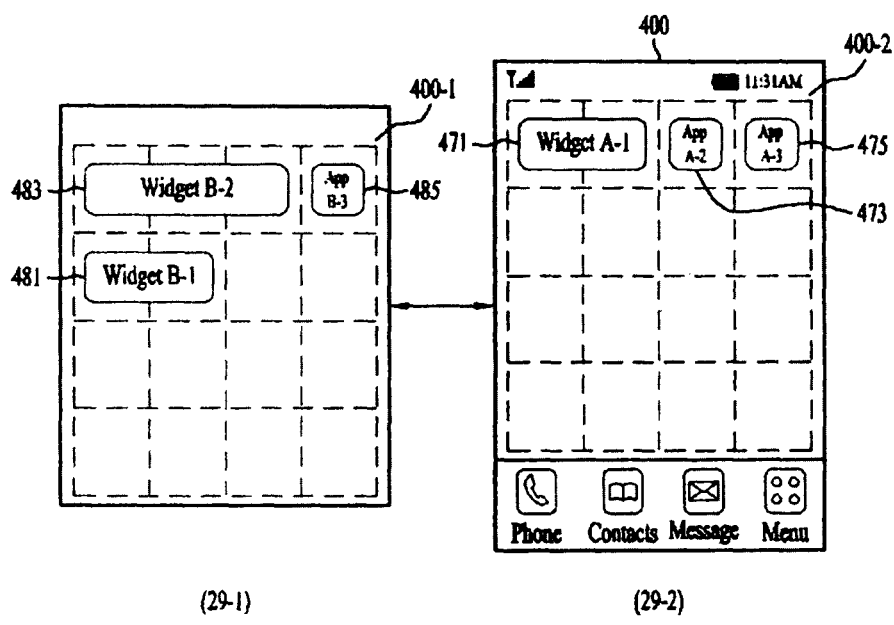

FIGS. 28 and 29 are diagrams of display screen configurations to implement a method of controlling a mobile terminal according to a further embodiment of the present invention. Referring to FIG. 28, $1^{st}$ to $3^{rd}$ home screens 400-1 to 400-3 may be previously prepared in the mobile terminal 100 (S231). In particular, objects, each of which has one of 2 attributes (i.e., an attribute A and an attribute B), may be dispersed across the $1^{st}$ to $3^{rd}$ home screens 400-1 to 400-3. In particular, the number of the attributes of the objects may be smaller than the number of the home screens.

A user command (e.g., a touch gesture, a mobile terminal shaking, etc.) for the grouping of the objects may be input. In response to the input user command, referring to FIG. 29, the controller 180 can delete the $3^{rd}$ home screen 400-3 to equalize the number of the home screens and the number of the attributes of the objects and controls the objects to be grouped in a manner that the objects of the same attribute gather to adhere close to each other on each of the home screens.

As the objects grouped on the $1^{st}$ and $2^{nd}$ home screens 400-1 to 400-3 are identical those described with reference to FIG. 25, their details are omitted from the following description.

Meanwhile, although an object belongs to the same category, it may be configured to have a different attribute in accordance with whether the object is a widget or an app icon. In this instance, although the objects belong to the same category, they may be arranged on different home screens in accordance with each of the objects is a widget or an app icon. That is, prescribed home screens more than those described with reference to FIG. 25, 27 or 29 may be used. For instance, when N home screens are required for the grouping, M home screens (i.e., $1^{st}$ to $M^{th}$ home screens) among N home screens are sequentially provided for widgets and (N−M) home screens (i.e., $(N-M)^{th}$ to $N^{th}$ home screens) among the N home screens may be sequentially provided for app icons, where N>M.

In the following description, a method of creating a folder including at least two objects (e.g., app icons, etc.) on the touchscreen is explained in detail with reference to FIG. 30.

Figure 30:
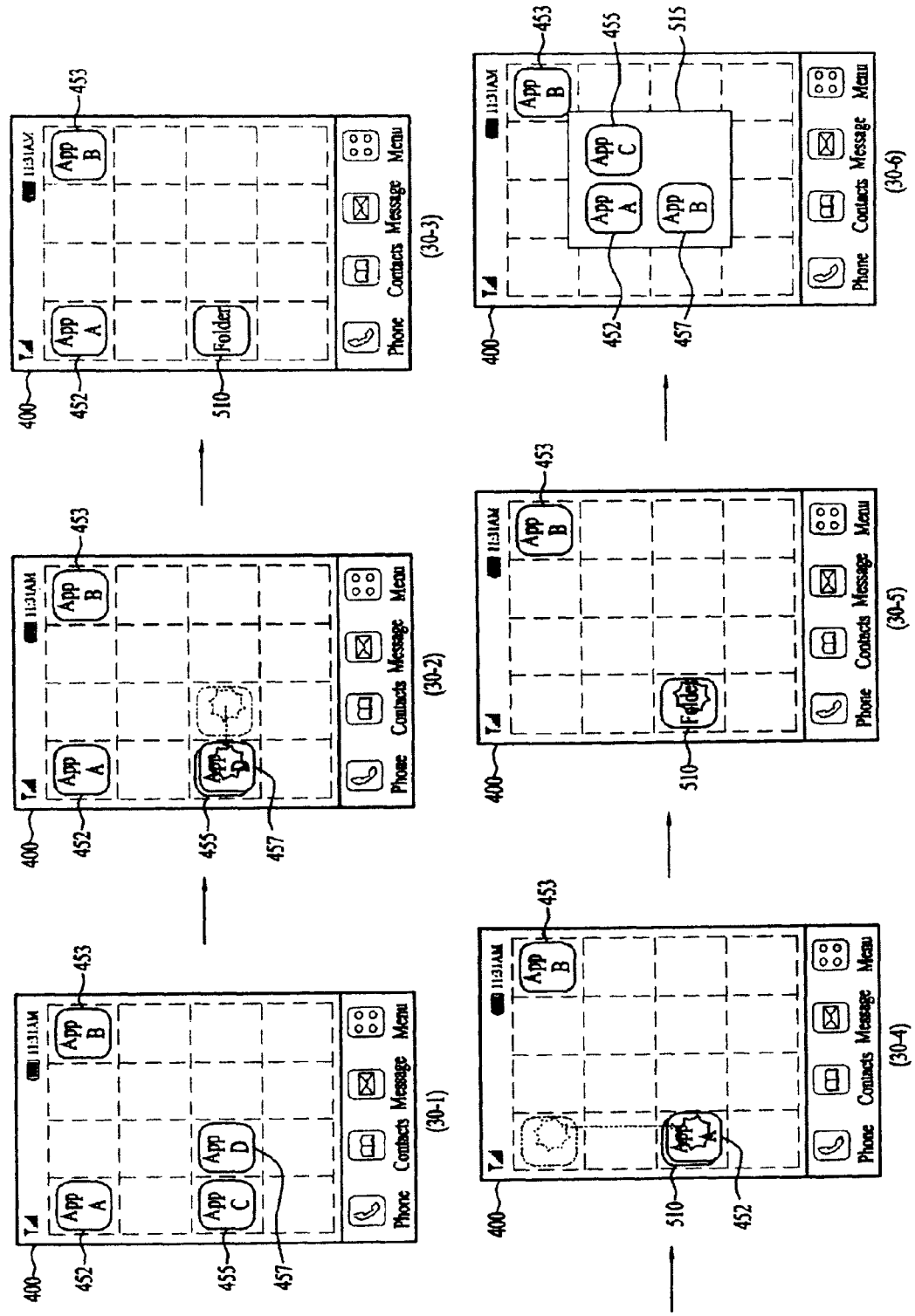

FIG. 30 is a diagram of display screen configurations to implement a method of controlling a mobile terminal according to a further embodiment of the present invention. Referring to FIG. 30 (30-1), a $1^{st}$ app icon 452, a $2^{nd}$ app icon 453, a $3^{rd}$ app icon 455 and a $4^{th}$ app icon 457 may be displayed on the touchscreen 400.

Referring to FIG. 30 (30-2), a terminal user touches the $4^{th}$ icon 457 with a pointer (e.g., a finger, a stylus pen, etc.) and may then drag the touched $4^{th}$ app icon 457 to the $3^{rd}$ app icon 455.

Referring to FIG. 30 (30-3), if the touch to the $4^{th}$ app icon 457 having moved onto the $3^{rd}$ app icon 455 is released, the controller 180 controls a folder 510 including the $3^{rd}$ app icon 455 and the $4^{th}$ app icon 457 to be created on the place previously occupied by the $3^{rd}$ app icon 455. As the folder 510 is created, the controller 180 controls the $3^{rd}$ app icon 455 and the $4^{th}$ app icon 457 to disappear from the touchscreen 400.

Referring to FIG. 30 (30-4), the terminal user touches the $1^{st}$ app icon 452 and may drag the touched $1^{st}$ app icon 452 to the created folder 510. Referring to FIG. 30 (30-5), if the touch to the $1^{st}$ app icon 452 having moved onto the folder 510 is released, the controller 180 controls the $1^{st}$ app icon 452 to move to the folder 510. As the $1^{st}$ app icon 452 moves to the folder 510, the controller 180 controls the $1^{st}$ app icon 452 to disappear from the touchscreen 400.

Thereafter, the terminal user may touch and select the folder 510. If so, referring to FIG. 30 (30-6), in response to the selection of the folder 510, the controller 180 controls a popup window 515 for the folder 510 to be created on the touchscreen 400. FIG. 30 (30-6) shows one example that the folder 510 disappears as soon as the popup window 515 is created. However, when the popup window 515 is created, the folder 510 may remain on the touchscreen 400.

On the created popup window 515, the $1^{st}$, $3^{rd}$ and $4^{th}$ app icons 452, 455 and 457 associated with the folder 510 may be displayed. Hence, if the terminal user touches and selects a desired app icon within the popup window 515, a desired application may be activated.

Meanwhile, while the popup window 515 is displayed, if any region of the touchscreen 400 outside the popup window 515 is touched, referring to FIG. 30 (30-5), the controller 180 controls the popup window 515 to disappear.

According to the above description (especially regarding FIG. 9), if the length of the performed touch drag gesture is not greater than the threshold, the controller 180 controls a size of the object arrangement grid 405 to be gradually decreased in proportion to the length of the touch drag gesture, but maintains relative positions among the objects as shown in FIG. 9 (9-2), which however this embodiment is not limited by. For example, the relative positions among the objects can be changed even if the length of the performed touch drag gesture is not greater than the threshold. This is described in detail with reference to FIG. 31 as follows.

Figure 31:
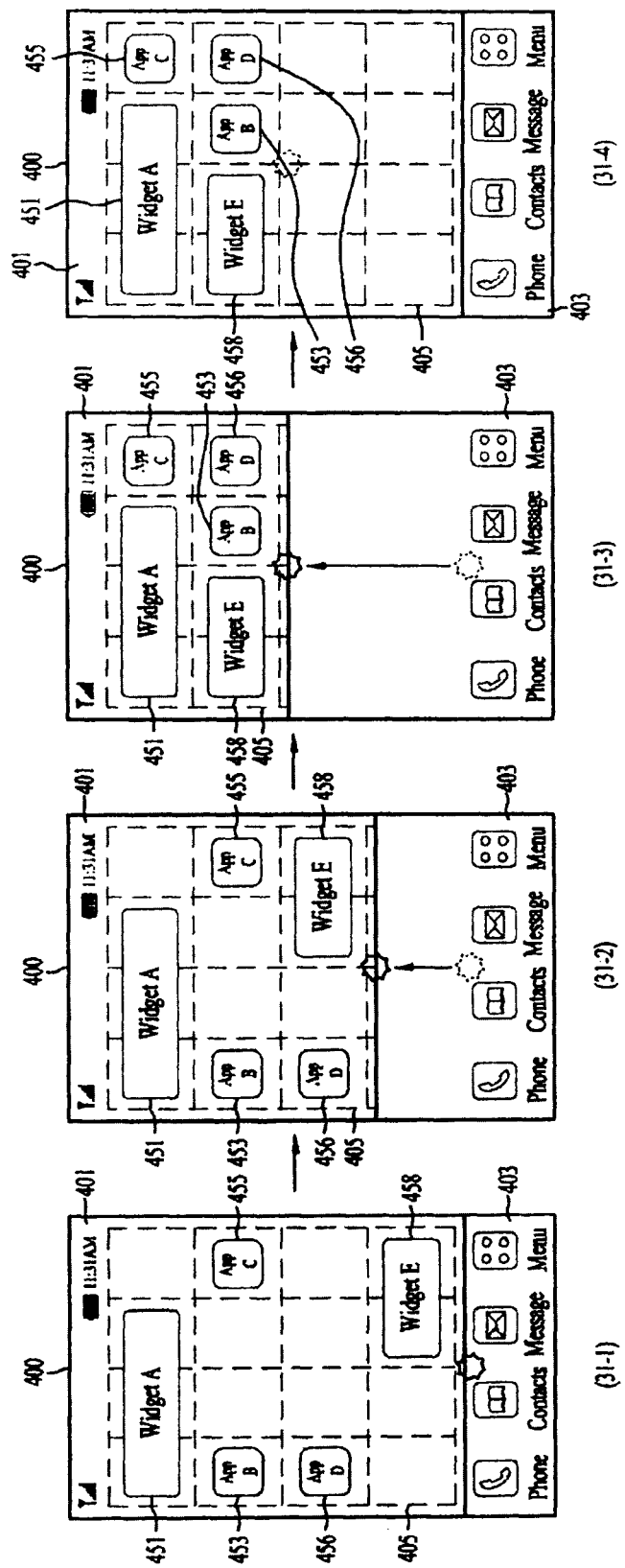

FIG. 31 is a diagram of display screen configurations to implement a method of controlling a mobile terminal according to another embodiment of the present invention. The following description may be made on the assumption that the mobile terminal 100 is or is not in the home screen edit mode. FIG. 31 shows that the object arrangement grid 405 is displayed on the touchscreen. However, it is not mandatory for the object arrangement grid 405 to be displayed on the touchscreen.

Referring to FIG. 31 (31-1), the home screen is displayed on the touchscreen 400. Further, a plurality of objects are dispersed and displayed on the home screen.

Referring to FIG. 31 (31-2), a single touch gesture may be input to the touchscreen 400 to group the objects. The touch gesture for grouping the objects may be performed by touching, with a pointer, a border between the $1^{st}$ region 401 and the $2^{nd}$ region 403 of the touchscreen 400 and then dragging the pointer in top direction (that is, bottom-to-top direction) by maintaining the corresponding touch. In FIG. 31 (31-2), since the touchscreen still keeps being touched with the pointer for the touch drag gesture, the touch drag gesture may be considered incomplete despite being initiated.

If so, as shown FIGS. 31 (31-1) and (31-2), in response to the touch drag gesture, the controller 180 controls the $2^{nd}$ region 403 to be gradually increased (that is, controls the 1st region 401 to be gradually decreased) in proportion to a length of the touch drag gesture. However, the controller 180 may control a size of the object arrangement grid 405 in the 1st region 401 to be maintained. As such, at least one (for example, widget E 458) of the objects within the object arrangement 405 which has originally located near to the $2^{nd}$ region 403 can be overlapped by the gradually increased $2^{nd}$ region 403.

Meanwhile, in response to the touch drag gesture, the controller 180 determines whether the length of the touch drag gesture is greater than a prescribed threshold. If the length of the touch drag gesture is not greater than the threshold, referring to FIG. 31 (31-2), the controller 180 controls only the overlapped object to move within the object arrangement grid 405 such that as the $2^{nd}$ region 403 increases, the overlapped object slidingly moves in the top direction just enough to escape from the increased $2^{nd}$ region 403. FIG. 31 (31-2) shows that the overlapped object, i.e., widget E 458 is slidingly pushed upward to locate above the increased $2^{nd}$ region 403 in proportion to the increased $2^{nd}$ region.

The incomplete touch drag gesture may continue to proceed along the straight line extending in one direction (that is, the bottom-to-top direction). If so, in response to the ongoing incomplete touch drag gesture, the controller 180 can determine whether the length of the touch drag gesture is greater than a prescribed threshold. If the length of the touch drag gesture is greater than the threshold, referring to FIG. 31 (31-3), the controller 180 controls the objects to be automatically grouped by being arranged or sorted in the one direction on the home screen by adhering close to each other. This is already explained in the foregoing description and thus its details are omitted from the following description for clarity of this specification. Once the grouping of the objects is completed, even if the touch drag gesture continues to proceed along the straight line in the top direction, the $2^{nd}$ region 403 may stop increasing (that is, the $1^{st}$ region 401 may stop decreasing).

If the grouping of the objects is completed, the pointer for the touch drag gesture stops moving any further and the touchscreen 400 can be released from the touch with the pointer, whereby the single touch gesture can be completed.

If so, referring to FIG. 31 (31-4), in response to the release of the touch with the pointer, the controller 180 controls the size of the $1^{st}$ region 401 and the size of the $2^{nd}$ region 403 to return to their original sizes. Subsequently, the controller 180 controls the objects to be grouped by adhering close to each other within the grid 405. Therefore, the grouping of the objects can be completed.

Meanwhile, before the objects are grouped, as shown in FIG. 31 (31-2), the pointer for the touch drag gesture stops moving and is detached from the touchscreen 400 to release the corresponding touch. Alternatively, before the objects are grouped, the pointer for the touch drag gesture may move to the initially touched position (i.e., the border between the $1^{st}$ and $2^{nd}$ regions) along a straight line in bottom direction (that is, top-to-bottom direction) opposite to the top direction instead of being detached from the touchscreen (not shown in the drawing). If so, the controller 180 controls the touchscreen 400 to return to the configuration shown in FIG. 31 (31-1).

Meanwhile, referring to FIG. 31 (31-3), even if the grouping of the objects is completed, before the pointer for the touch drag gesture is detached from the touchscreen 400 to release the touch, the pointer may move toward the initially touched position along a straight line in the bottom direction opposite to the top direction.

In this instance, the controller 180 calculates a distance between the initially touched position of the pointer and a finally located position of the pointer. If the calculated distance is smaller than the threshold, the controller 180 can control the touchscreen to return to the configuration shown in FIG. 31 (31-2).

Moreover, referring to FIG. 31 (31-3), in order for the objects to adhere closer to each other, relative positions among the objects may be changed. The process for changing the relative positions is already explained in the foregoing description and thus its details are omitted from the following description for clarity of this specification.

Accordingly, embodiments of the present invention provide various effects and/or features.

According to at least one of embodiments of the present invention, when an application is downloaded, an icon and widget downloaded together with the application can be conveniently created on a home screen displayed on a display unit of a mobile terminal.

According to at least one of embodiments of the present invention, when an application is downloaded, an icon and widget downloaded together with the application can be conveniently arranged on a home screen displayed on a display unit of a mobile terminal.

It will be appreciated by those skilled in the art that the present invention can be specified into other form(s) without departing from the spirit or scope of the inventions.

In addition, the above-described methods can be implemented in a program recorded medium as computer-readable codes. The computer-readable media may include all kinds of recording devices in which data readable by a computer system are stored. The computer-readable media may include ROM, RAM, CD-ROM, magnetic tapes, floppy discs, optical data storage devices, and the like for example and also include carrier-wave type implementations (e.g., transmission via Internet). Further, the computer may include the controller 180 of the terminal.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:
1. A mobile terminal comprising:
a wireless communication unit configured to wirelessly communicate with at least one other terminal;
a touchscreen configured to display a home screen; and
a controller configured to:
display a plurality of objects dispersed on the home screen, receive a specific touch gesture performed on the touchscreen, and arrange and display the dispersed objects on the home screen in which the dispersed objects are moved closer to each other based on a prescribed direction of the specific touch gesture, wherein the moved objects are adhered close to each other such that relative positions among the adhered objects are changeable according to their sizes within the home screen.

2. The mobile terminal of claim 1, wherein the specific touch gesture comprises a touch drag gesture in the prescribed direction, and wherein the controller is further configured to arrange and display the dispersed objects to be closer to one side among four sides of the touchscreen corresponding to the prescribed direction of the specific touch gesture.

3. The mobile terminal of claim 2, wherein the controller is further configured to arrange and display the dispersed objects to be closer to the one side in which a first object having a largest size among the objects is arranged closest to the one side.

4. The mobile terminal of claim 3, wherein the controller is further configured to arrange and display the dispersed objects to be closer to the one side in which a second object having a second largest size among the objects to be closest to the one side in parallel with the first object, and wherein when a space for enabling the second object to be closest to the one side does not exist on the one side, the controller is further configured to move the second object to exist close to the one side by leaving the first object in-between the second object and the one side.

5. The mobile terminal of claim 2, wherein when the touch drag gesture is performed over a predetermined threshold distance, the controller is further configured to move the objects to be close to each other.

6. The mobile terminal of claim 2, wherein when the touch drag gesture selects one object of the plurality of the objects, the controller is further configured to move the rest of the objects except the selected one object to be close to the one side.

7. The mobile terminal of claim 6, wherein when the selected one object is touched with a first pointer, and the touch drag gesture is performed using a second pointer, the controller is further configured to move the rest of the objects except the selected one object to be close to the one side.

8. The mobile terminal of claim 1, further comprising:

a sensing unit configured to sense a motion of the mobile terminal, wherein the controller is further configured to move the dispersed objects to be close to each other on the home screen in accordance with the sensed motion of the mobile terminal.

9. The mobile terminal of claim 1, wherein the controller is further configured to move the objects to be close to each other by grouping objects in accordance with corresponding attributes.

10. The mobile terminal of claim 9, wherein the controller is further configured to group objects having the same attributes.

11. The mobile terminal of claim 9, wherein the controller is further configured to display a first home screen including a plurality of dispersed objects on the touchscreen among a plurality of home screens, wherein when the specific touch gesture is performed on the touchscreen, the controller is further configured to group the dispersed objects into a first set of objects on the first home screen and a second set of objects on a second home screen, and wherein the first set of objects have a same first attribute and the second set of objects have a same second attribute different than the first attribute.

12. The mobile terminal of claim 11, wherein the controller is further configured to group the dispersed objects into a third set of objects having a same third attribute, and wherein when a third home screen is not yet created, the controller is further configured to automatically create a new third home screen and display the third set of objects on the third home screen.

13. The mobile terminal of claim 11, wherein the first set of objects include application icons and the second set of objects include widgets.

14. The mobile terminal of claim 10, wherein when a number of the grouped objects is less than a number of currently available home screens, the controller is further configured to delete any extra home screens not including any grouped objects.

15. The mobile terminal of claim 1, wherein the controller is further configured to display a background image on the home screen and move the objects to be close to each other by avoiding a specific region of the background image.

16. The mobile terminal of claim 15, wherein the specific region comprises a region designated by either a user or an image provider.

17. The mobile terminal of claim 15, wherein the controller is further configured to automatically recognize a region containing a specific shape of the background image as being the specific region to be avoided.

18. A method of controlling a mobile terminal, the method comprising:

displaying, via a touchscreen of the mobile terminal, a home screen;

displaying, via the touchscreen, a plurality of objects dispersed on the home screen;

receiving, via a controller of the mobile terminal, a specific touch gesture performed on the touchscreen; and arranging and displaying, via the controller, the dispersed objects on the home screen in which the dispersed objects are moved closer to each other based on a prescribed direction of the specific touch gesture, wherein the moved objects are adhered close to each other such that relative positions among the adhered objects are changeable according to their sizes within the home screen.

19. The method of claim 18, wherein the specific touch gesture comprises a touch drag gesture in the prescribed direction, and wherein the arranging and displaying step arranges and displays the dispersed objects to be closer to one side among four sides of the touchscreen corresponding to the prescribed direction of the specific touch gesture.

20. The method of claim 19, wherein the arranging and displaying step arranges and displays the dispersed objects to be closer to the one side in which a first object having a largest size among the objects is arranged closest to the one side.

* * * * *